(12) United States Patent
Choi et al.

(10) Patent No.: US 11,928,280 B2
(45) Date of Patent: Mar. 12, 2024

(54) ELECTRONIC DEVICE

(71) Applicant: SAMSUNG DISPLAY CO., LTD., Yongin-si (KR)

(72) Inventors: Jaeuk Choi, Seoul (KR); Yun-Ho Kim, Hwaseong-si (KR); Chul Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/737,141

(22) Filed: May 5, 2022

(65) Prior Publication Data

US 2023/0025817 A1 Jan. 26, 2023

(30) Foreign Application Priority Data

Jul. 26, 2021 (KR) ........................ 10-2021-0097621

(51) Int. Cl.
*G06F 3/044* (2006.01)
*G06F 3/041* (2006.01)

(52) U.S. Cl.
CPC ........ *G06F 3/04164* (2019.05); *G06F 3/0412* (2013.01); *G06F 3/041662* (2019.05); *G06F 3/0443* (2019.05); *G06F 3/0446* (2019.05); *G06F 2203/04111* (2013.01)

(58) Field of Classification Search
CPC ............... G06F 3/04164; G06F 3/0412; G06F 3/041662; G06F 3/0443; G06F 3/0446; G06F 2203/04111; G06F 3/04166; G06F 3/04162; G06F 3/03545; G06F 3/0383
See application file for complete search history.

(56) References Cited

U.S. PATENT DOCUMENTS

| 9,990,080 B2 | 6/2018 | Shin et al. |
| 10,054,466 B2 | 8/2018 | Matsumoto |
| 10,073,558 B2 | 9/2018 | Kobori et al. |
| 2014/0043284 A1* | 2/2014 | Park ...................... G06F 3/0445 345/174 |
| 2014/0125628 A1* | 5/2014 | Yoshida ................ G06F 3/0445 345/174 |

(Continued)

FOREIGN PATENT DOCUMENTS

| KR | 10-1727589 | 5/2017 |
| KR | 10-1727590 | 5/2017 |
| KR | 10-2213697 | 2/2021 |

*Primary Examiner* — Md Saiful A Siddiqui
(74) *Attorney, Agent, or Firm* — F. Chau & Associates, LLC

(57) ABSTRACT

An electronic device includes a display panel, an input sensor disposed on the display panel and including a plurality of sensing electrodes and a plurality of sensing lines connected to the sensing electrodes, and a driving circuit that drives the input sensor and generates a control signal based on a type of input applied to the input sensor. The sensing lines include a first sensing line electrically connecting first ends of the sensing electrodes adjacent to each other among the sensing electrodes, and a second sensing line connecting at least one of second ends, which are opposite to the first ends, of the adjacent sensing electrodes to the driving circuit and selectively connecting other sensing electrodes to the driving circuit or a reference electric potential in response to the control signal.

20 Claims, 28 Drawing Sheets

(56) References Cited

U.S. PATENT DOCUMENTS

| | | | |
|---|---|---|---|
| 2015/0035793 A1* | 2/2015 | Hirotsune | G06F 3/03545 345/174 |
| 2015/0049044 A1* | 2/2015 | Yousefpor | G06F 3/04186 345/174 |
| 2016/0179249 A1* | 6/2016 | Ballan | G06F 3/0446 345/174 |
| 2017/0192551 A1* | 7/2017 | Kim | G06F 3/0446 |
| 2018/0120971 A1* | 5/2018 | Lee | G06F 3/0446 |
| 2019/0050106 A1* | 2/2019 | Lee | G06F 3/0445 |
| 2019/0278391 A1* | 9/2019 | Mizuhashi | G06F 3/046 |

* cited by examiner

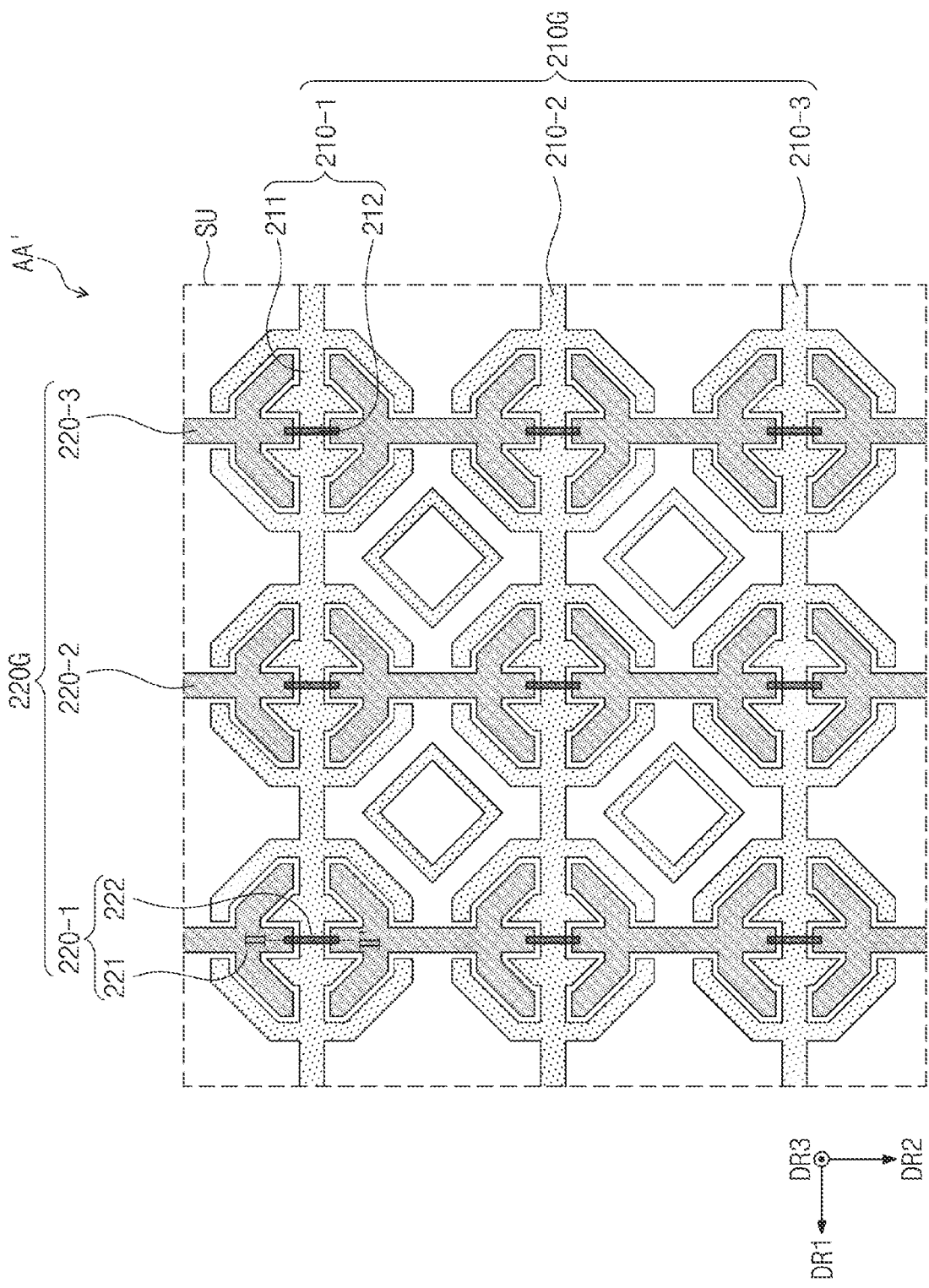

ELECTRONIC DEVICE

CROSS-REFERENCE TO RELATED APPLICATION

This U.S. non-provisional patent application claims priority under 35 U.S.C. § 119 to Korean Patent Application No. 10-2021-0097621, filed on Jul. 26, 2021, the disclosure of which is hereby incorporated by reference in its entirety.

TECHNICAL FIELD

Embodiments of the present disclosure relate to an electronic device, and more particularly, an electronic device having increased sensing sensitivity.

DISCUSSION OF RELATED ART

Multimedia electronic devices, such as televisions, mobile phones, tablet computers, navigation units, game units, etc., may include an electronic device that displays images. The electronic device may further include an input sensor that provides a touch-based input method allowing users to easily and intuitively input information or commands in addition to other input methods such as a button, a keyboard, a mouse, etc.

The input sensor may sense a touch or pressure generated by a user's body (e.g., provided by a user's finger). In addition to using a user's body part, such as a finger, to sense a touch or pressure, the demand for the use of a pen as a touch input device is increasing for users who are familiar with inputting information using a writing instrument or for specific application programs (e.g., for sketching or drawing application programs) that may benefit from more detailed and precise touch input.

SUMMARY

Embodiments of the present disclosure provide an electronic device with increased sensing sensitivity.

Embodiments of the present disclosure provide an electronic device capable of reducing an attenuation of an induced current flowing through an input sensor according to a resistance by biasing a portion of a sensing electrode with a specific reference voltage.

Embodiments of the present disclosure provide an electronic device including a display panel, an input sensor disposed on the display panel and including a plurality of sensing electrodes and a plurality of sensing lines connected to the sensing electrodes, and a driving circuit that drives the input sensor and generates a control signal based on a type of input applied to the input sensor. The sensing lines include a first sensing line electrically connecting first ends of the sensing electrodes adjacent to each other among the sensing electrodes and a second sensing line connecting at least one of second ends, which are opposite to the first ends, of the adjacent sensing electrodes to the driving circuit and selectively connecting other sensing electrodes to the driving circuit or a reference electric potential in response to the control signal.

In an embodiment, the driving circuit generates a first control signal when the input applied to the input sensor is generated by a user touch and generates a second control signal when the input applied to the input sensor is generated by an input device.

In an embodiment, the second sensing line connects the other sensing electrodes to the driving circuit when the first control signal is generated and connects the other sensing electrodes to the reference electric potential when the second control signal is generated.

In an embodiment, the input sensor is disposed directly on the display panel.

In an embodiment, the input sensor includes a plurality of sensing electrode groups each including the sensing electrodes adjacent to each other, and each of the sensing electrode groups forms a closed-loop defined by the sensing electrodes adjacent to each other, the first sensing line, and the second sensing line.

In an embodiment, the input sensor includes a plurality of sensing units, and each of the sensing electrode groups is disposed in each of the sensing units.

In an embodiment, the sensing electrode groups include first sensing electrode groups extending in a first direction and arranged in a second direction crossing the first direction, and second sensing electrode groups arranged in the first direction and extending in the second direction.

In an embodiment, the sensing units are defined as areas where the first sensing electrode groups cross the second sensing electrode groups.

In an embodiment, each of the first sensing electrode groups includes n sensing electrodes adjacent to each other, and each of the second sensing electrode groups includes m sensing electrodes adjacent to each other, where n and m are natural numbers.

In an embodiment, n and the m are the same natural number.

In an embodiment, the second sensing line includes a switch, and the switch receives the control signal and is selectively connected to the driving circuit or the reference electric potential based on the control signal.

In an embodiment, the electronic device further includes a flexible circuit board provided with the driving circuit disposed thereon and connected to the input sensor, and the switch is disposed on the flexible circuit board.

In an embodiment, the display panel includes a display area and a non-display area adjacent to the display area, the input sensor includes a sensing area corresponding to the display area and a peripheral area corresponding to the non-display area, the sensing electrodes are disposed in the sensing area, and the sensing lines are disposed in the peripheral area.

Embodiments of the present disclosure provide an electronic device including a display panel, an input sensor disposed on the display panel and including a plurality of sensing electrodes and a plurality of sensing lines connected to the sensing electrodes, and a driving circuit that drives the input sensor and generates a first control signal or a second control signal based on a type of input applied to the input sensor. The sensing lines include a first sensing line electrically connecting a first end of a first sensing electrode and a first end of a second sensing electrode adjacent to the first sensing electrode among the sensing electrodes, and a second sensing line including a switch connecting a second end of the first sensing electrode to the driving circuit, connecting the second sensing electrode to the driving circuit when the first control signal is provided, and connecting the second sensing electrode to a reference electric potential when the second control signal is provided.

In an embodiment, the driving circuit generates the first control signal when the input applied to the input sensor is generated by a user touch and generates the second control signal when the input applied to the input sensor is generated by an input device.

In an embodiment, the input sensor includes a plurality of sensing electrode groups respectively including the first sensing electrode and the second sensing electrode, and the sensing electrode groups include first sensing electrode groups extending in a first direction and arranged in a second direction crossing the first direction and second sensing electrode groups arranged in the first direction and extending in the second direction.

In an embodiment, the input sensor includes a plurality of sensing units defined as areas where the first sensing electrode groups cross the second sensing electrode groups.

In an embodiment, each of the sensing electrode groups forms a closed-loop defined by the first sensing line and the second sensing line.

In an embodiment, the input sensor includes a sensing area in which the sensing electrodes are disposed and a peripheral area adjacent to the sensing area, and the switch is disposed in the peripheral area of the input sensor or on a circuit board on which the driving circuit is disposed.

Embodiments of the present disclosure provide an electronic device including a display panel, an input sensor disposed on the display panel, and a driving circuit that drives the input sensor. The input sensor includes a first sensing electrode, a second sensing electrode adjacent to the first sensing electrode, a first sensing line connecting one of the first sensing electrode and the second sensing electrode to the driving circuit, and a second sensing line selectively connecting the other one of the first sensing electrode and the second sensing electrode to the driving circuit or a reference electric potential.

According to embodiments of the present disclosure, the electronic device is capable of reducing the attenuation of the induced current flowing through the input sensor according to the resistance by biasing a portion of the sensing electrode with the specific reference voltage.

BRIEF DESCRIPTION OF THE DRAWINGS

The above and other features of the present disclosure will become readily apparent by describing in detail embodiments thereof with reference to the accompanying drawings, in which:

FIGS. 5B to 5D are enlarged views showing sensing electrodes in a sensing unit shown in FIG. 5A;

DETAILED DESCRIPTION

Figure 1A:
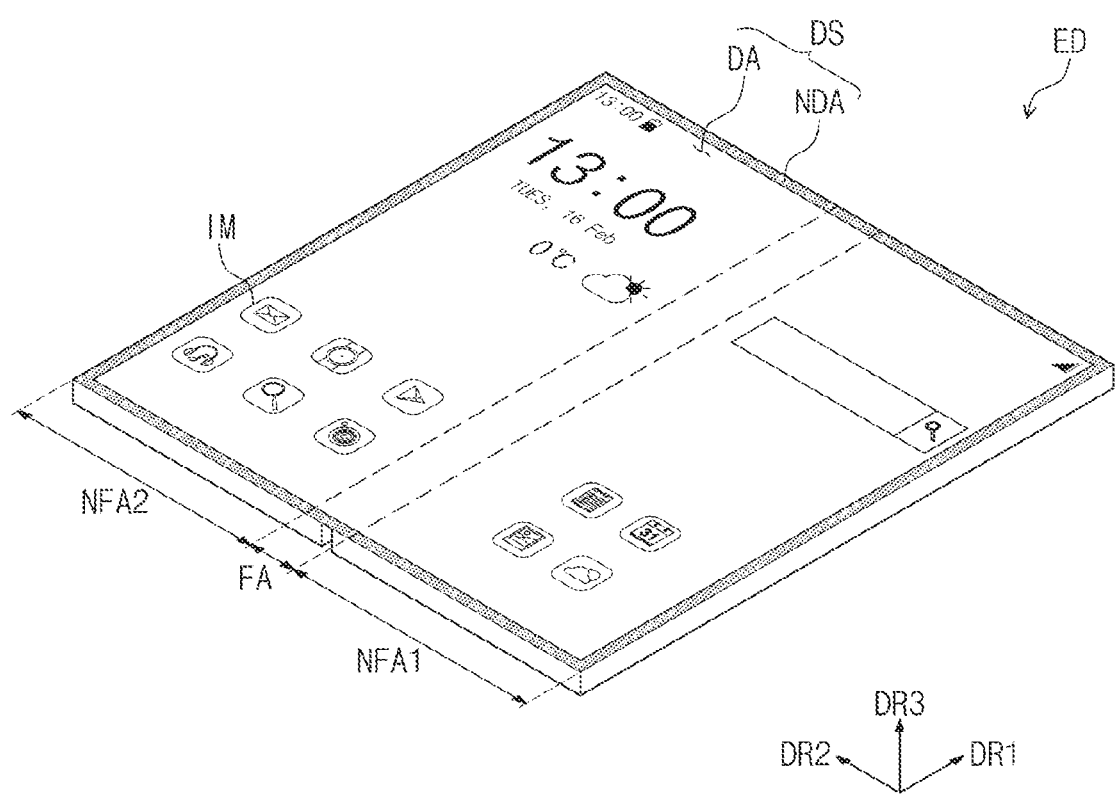
FIGS. 1A and 1B are perspective views showing an electronic device according to an embodiment of the present disclosure.

Embodiments of the present disclosure will be described more fully hereinafter with reference to the accompanying drawings. Like reference numerals may refer to like elements throughout the accompanying drawings.

In the present disclosure, it will be understood that when an element or layer is referred to as being "on", "connected to" "coupled to", or "adjacent to" another element or layer, it can be directly on, connected, coupled, or adjacent to the other element or layer, or intervening elements or layers may be present. Other uses of these terms and similar terms to describe the relationships between components should be interpreted in a like fashion.

It will be understood that, although the terms "first", "second", etc. may be used herein to describe various elements, these elements should not be limited by these terms. These terms are only used to distinguish one element from another element. Thus, a "first" element discussed below could be termed a "second" element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" etc., may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art.

Figure 1B:
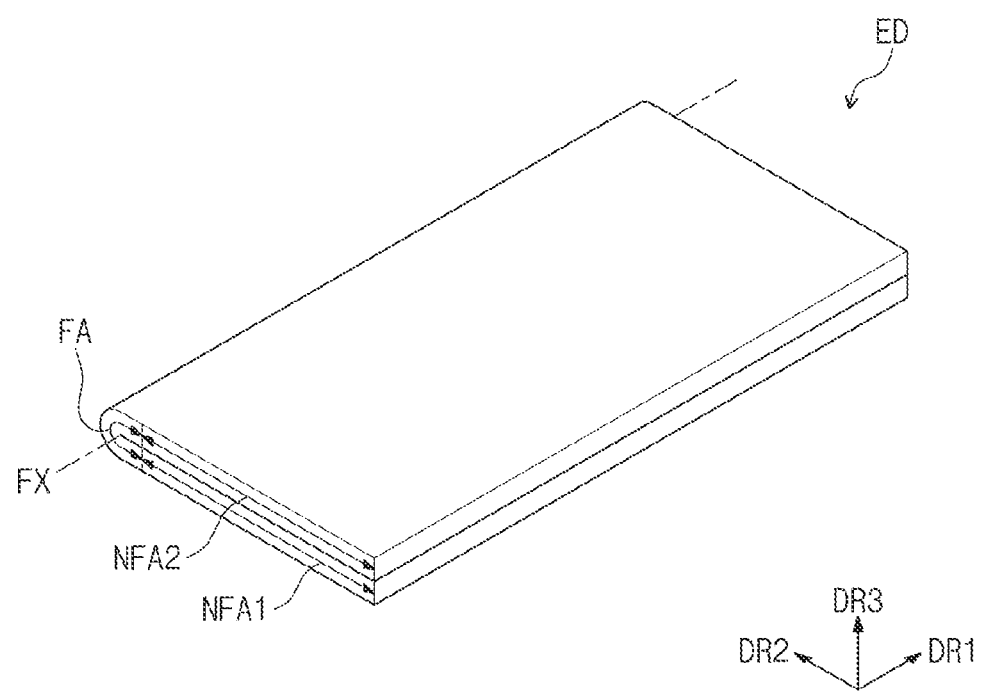

FIGS. 1A and 1B are perspective views showing an electronic device ED according to an embodiment of the present disclosure. FIG. 1A shows an unfolded state of the electronic device ED, and FIG. 1B shows a folded state of the electronic device ED.

Referring to FIGS. 1A and 1B, the electronic device ED may be activated in response to electrical signals. The electronic device ED may be, for example, a mobile phone, a foldable mobile phone, a tablet computer, a car navigation unit, a game unit, or a wearable device. However, the electronic device ED is not limited thereto. For example, although FIGS. 1A and 1B show the foldable mobile phone as the electronic device ED as a representative example, the electronic device ED is not limited to the foldable mobile phone.

The electronic device ED may include a display surface DS defined by a first direction DR1 and a second direction DR2 crossing the first direction DR1. The electronic device ED may provide an image IM to a user through the display surface DS.

The display surface DS may include a display area DA and a non-display area NDA around the display area DA. The display area DA may display the image IM, and the image IM is not displayed in the non-display area NDA. The non-display area NDA may surround the display area DA. However, embodiments of the present disclosure are not limited thereto, and the shape of the display area DA and the shape of the non-display area NDA may be changed.

Hereinafter, a direction substantially perpendicular to a plane defined by the first direction DR1 and the second direction DR2 may be referred to as a third direction DR3. In the present disclosure, the expression "when viewed in a plane" may mean a state of being viewed in the third direction DR3.

The electronic device ED may include a folding area FA (or a foldable area) and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The first non-folding area NFA1, the folding area FA, and the second non-folding area NFA2 may be sequentially defined in the electronic device ED along the second direction DR2.

As shown in FIG. 1B, the folding area FA may be folded with respect to a folding axis FX substantially parallel to the first direction DR1. The folding area FA may extend in the first direction DR1. The folding area FA may be folded to have a predetermined curvature and a radius of curvature. The electronic device ED may be inwardly folded (inner-folding) such that the first non-folding area NFA1 faces the second non-folding area NFA2 and the display surface DS is not exposed to the outside.

According to an embodiment, the electronic device ED may be outwardly folded (outer-folding) such that the display surface DS is exposed to the outside. According to an embodiment, the electronic device ED may be provided such that the inner-folding operation and an unfolding operation are repeated or the outer-folding operation and the unfolding operation are repeated. However, embodiments of the present disclosure are not limited thereto. According to an embodiment, the electronic device ED may be provided to carry out at least one of the unfolding operation, the inner-folding operation, and the outer-folding operation.

Figure 2:
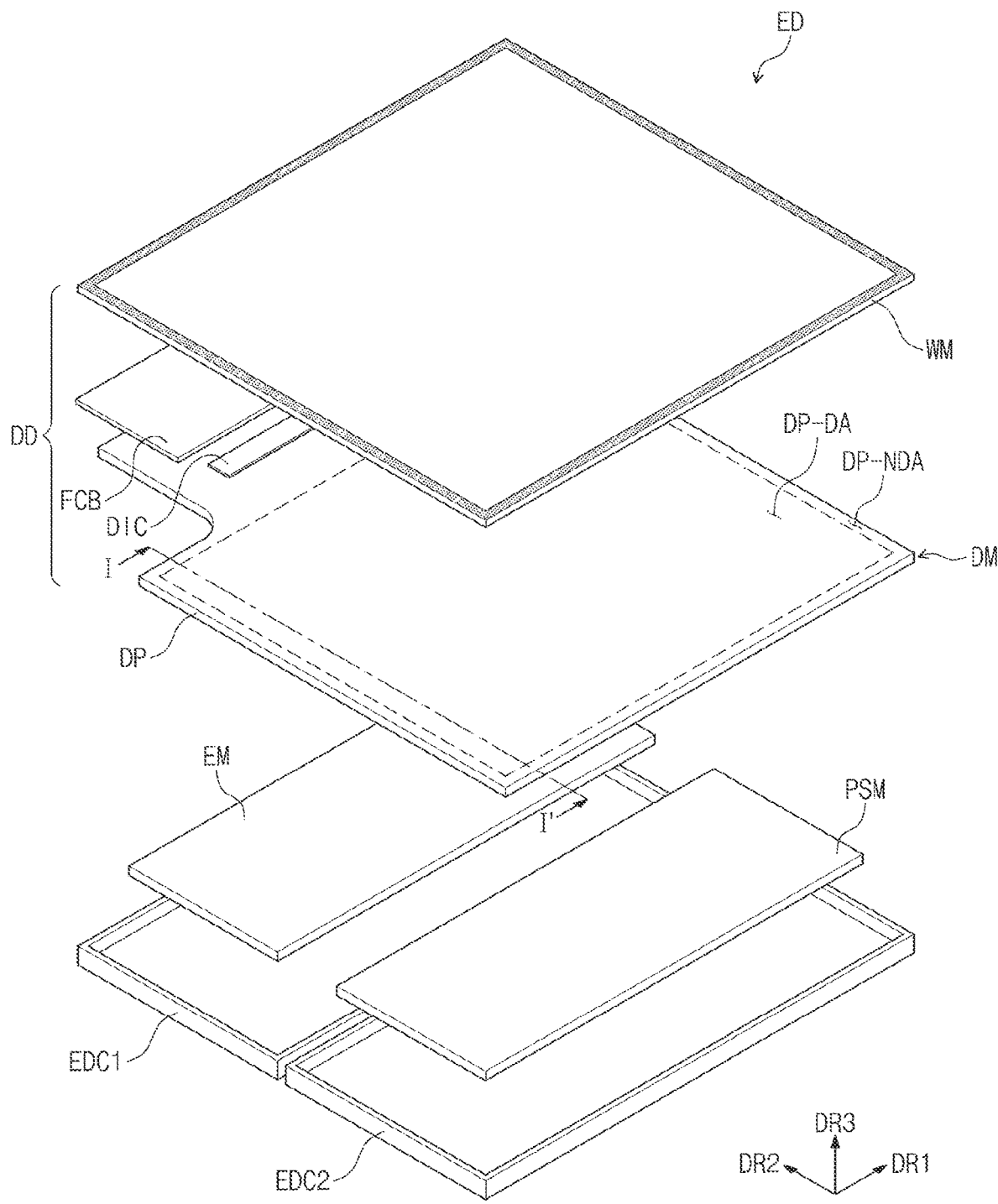
FIG. 2 is an exploded perspective view showing an electronic device according to an embodiment of the present disclosure.

FIG. 2 is an exploded perspective view showing the electronic device ED according to an embodiment of the present disclosure.

Referring to FIG. 2, the electronic device ED may include a display device DD, an electronic module EM, a power supply module PSM, and cases EDC1 and EDC2. In an embodiment, the electronic device ED may include a mechanical component to control a folding operation of the display device DD.

The display device DD may generate an image and may sense an external input. The display device DD may include a window module WM and a display module DM. The window module WM may provide a front surface of the electronic device ED.

The display module DM may include at least a display panel DP. In FIG. 2, although the display module DM is shown as being the same as the display panel DP, in embodiments, the display module DM may have a stack structure in which a plurality of components are stacked on one another. A detailed description of the stack structure of the display module DM will be described further below.

The display panel DP may include a display area DP-DA and a non-display area DP-NDA, which respectively correspond to the display area DA (refer to FIG. 1A) and the non-display area NDA (refer to FIG. 1A) of the electronic device ED. In the present disclosure, the expression "an area/portion corresponds to another area/portion" means that "an area/portion overlaps another area/portion." However, the "areas and portions" are not limited to having the same size as each other. The display module DM may include a driving chip DIC disposed in the non-display area DP-NDA. The display module DM may further include a flexible circuit film FCB coupled to the non-display area DP-NDA.

The driving chip DIC may include driving elements to drive pixels of the display panel DP, e.g., a data driving circuit. FIG. 2 shows a structure in which the driving chip DIC is mounted on the display panel DP, however, the present disclosure should not be limited thereto. As an example, the driving chip DIC may be mounted on the flexible circuit film FCB.

The electronic module EM may include at least a main driver. The electronic module EM may include, for example, a wireless communication module, a camera module, a proximity sensor module, an image input module, an audio input module, an audio output module, a memory, an external interface, etc. The electronic module EM may be electrically connected to the power supply module PSM.

The main driver (or a main controller) may control an overall operation of the electronic device ED. As an example, the main driver may activate or deactivate the display device DD in response to a user input. The main driver may control operations of the display device DD and other modules. The main driver may include at least one microprocessor.

The cases EDC1 and EDC2 may accommodate the display module DM, the electronic module EM, and the power supply module PSM. Two cases EDC1 and EDC2 separated from each other are shown as a representative example, however, the cases are not limited thereto. In embodiments, the electronic device ED may further include a hinge structure that connects the two cases EDC1 and EDC2. Each of the cases EDC1 and EDC2 may be coupled to the window module WM. The cases EDC1 and EDC2 may protect the display module DM, the electronic module EM, and the power supply module PSM, which are accommodated in the cases EDC1 and EDC2.

Figure 3A:
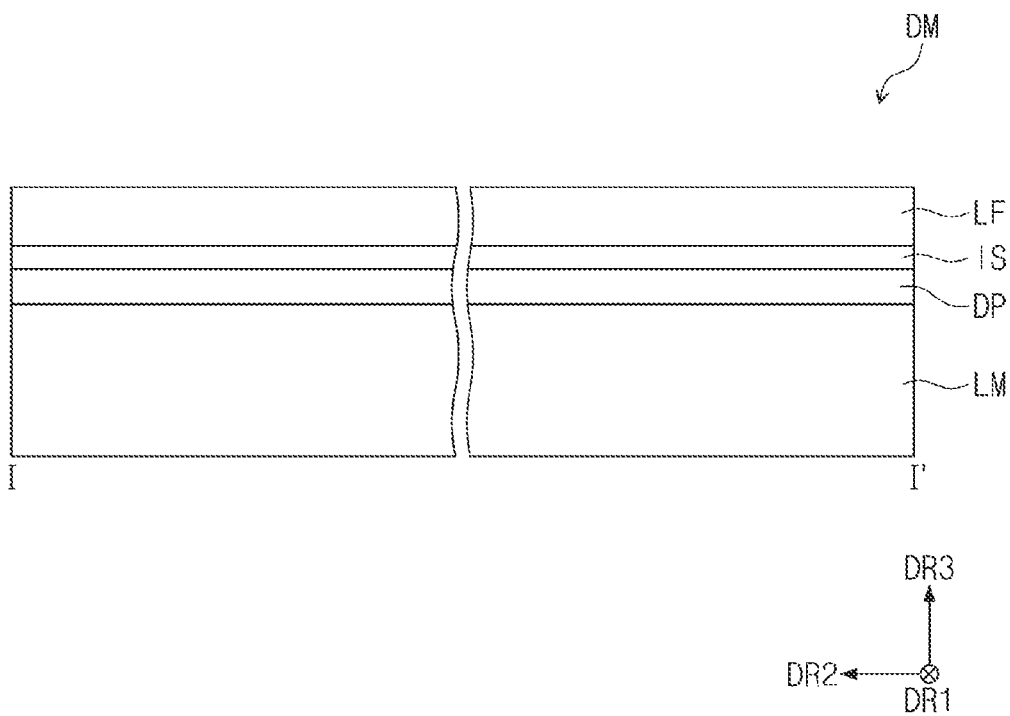
FIG. 3A is a cross-sectional view showing a display module according to an embodiment of the present disclosure.

FIG. 3A is a cross-sectional view showing the display module DM according to an embodiment of the present disclosure.

Referring to FIG. 3A, the display module DM may include a display panel DP, an optical film LF disposed on the display panel DP, and a lower member LM disposed under the display panel DP. The display module DM may include an input sensor IS disposed on the display panel DP. An adhesive layer may be disposed between the members.

The display panel DP may include a configuration that generates an image. The display panel DP may be a light emitting type display layer. As an example, the display panel DP may be an organic light emitting display layer, a quantum dot display layer, a micro-LED display layer, or a nano-LED display layer. However, the display panel DP is not limited thereto.

The input sensor IS may be disposed on the display panel DP. The input sensor IS may sense an external input applied thereto from the outside. The input sensor IS may be an external sensor attached to the display panel DP, and the input sensor IS may be an integrated sensor formed during a manufacturing process of the display panel DP.

The optical film LF may reduce a reflectance of the external light incident thereto from the outside. The optical film LF may include a retarder and/or a polarizer. The optical film LF may include at least a polarizing film.

According to an embodiment, the optical film LF may include color filters. The color filters may be arranged in a predetermined arrangement. The arrangement of the color filters may be determined by taking into account emission colors of the pixels included in the display panel DP. The optical film LF may further include a black matrix disposed adjacent to the color filters.

According to an embodiment, the optical film LF may include a destructive interference structure. For example, the destructive interference structure may include a first reflection layer and a second reflection layer, which are disposed on different layers from each other. A first reflection light and a second reflection light, which are reflected by the first reflection layer and the second reflection layer, respectively, may be destructively interfered, and thus, the reflectance of the external light may be reduced.

The lower member LM may include a variety of functional members. For example, the lower member LM may include a light blocking layer that blocks a light incident to the display panel DP, an impact absorbing layer that absorbs an external impact, a supporting layer that supports the display panel DP, and a heat dissipation layer that dissipates heat generated by the display panel DP.

Figure 3B:
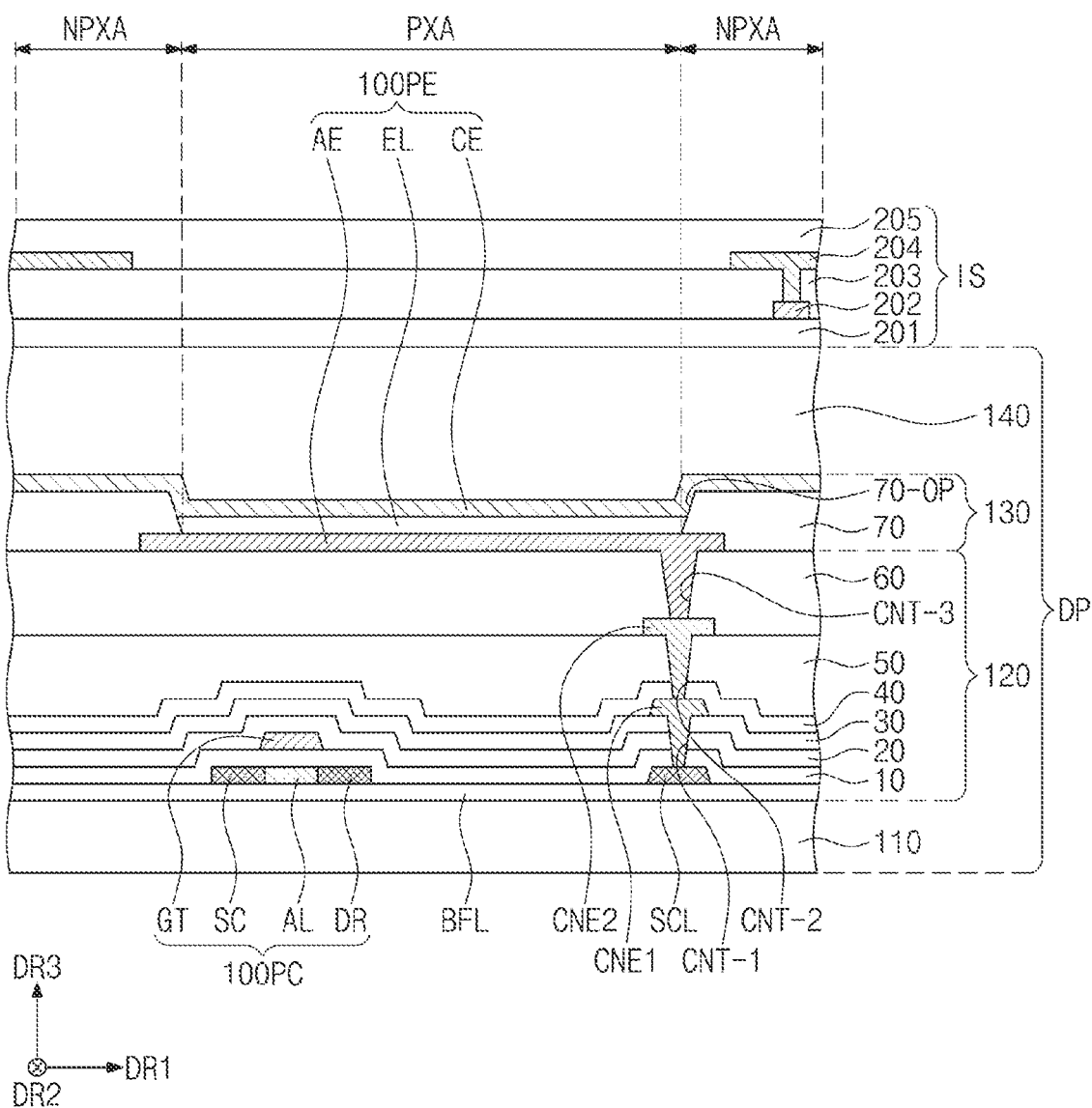
FIG. 3B is a cross-sectional view showing a display panel according to an embodiment of the present disclosure.

FIG. 3B is a plan view showing the display panel according to an embodiment of the present disclosure.

Referring to FIG. 3B, the display panel DP may include a base layer 110, a circuit layer 120, a light emitting element layer 130, and an encapsulation layer 140.

The base layer 110 may provide a base surface on which the circuit layer 120 is disposed. The base layer 110 may be, for example, a glass substrate, a metal substrate, or a polymer substrate. However, embodiment of the present disclosure are not limited thereto. For example, according to embodiments, the base layer 110 may be, for example, an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include, for example, at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. In the present disclosure, the term "X-based resin", as used herein, refers to the resin that includes a functional group of X.

At least one inorganic layer may be formed on an upper surface of the base layer 110. The inorganic layer may include at least one of, for example, aluminum oxide, titanium oxide, silicon oxide, silicon nitride, silicon oxynitride, zirconium oxide, and hafnium oxide. The inorganic layer may be formed in multiple layers. The inorganic layers formed in multiple layers may form a barrier layer and/or a buffer layer. In an embodiment, the display panel DP may include a buffer layer BFL.

The buffer layer BFL may increase a coupling force between the base layer 110 and a semiconductor pattern. The buffer layer BFL may include at least one of, for example, silicon oxide, silicon nitride, and silicon oxynitride. As an example, buffer layer BFL may have a structure in which a silicon oxide layer and a silicon nitride layer are alternately stacked with each other.

The semiconductor pattern may be disposed on the buffer layer BFL. The semiconductor pattern may include polysilicon, however, the semiconductor pattern is not limited thereto. The semiconductor pattern may include, for example, amorphous silicon, low-temperature polycrystalline silicon, or oxide semiconductor.

FIG. 3B shows only a portion of the semiconductor pattern, and the semiconductor pattern may be further disposed in other areas. The semiconductor pattern may be arranged with a specific rule over the pixels. The semiconductor pattern may have different electrical properties depending on whether it is doped, or whether it is doped with an N-type dopant or a P-type dopant. The semiconductor pattern may include a first region with high conductivity and a second region with low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or may be doped at a concentration lower than the high conductivity region.

The first region may have a conductivity greater than that of the second region and may substantially serve as an electrode or a signal line. The second region may substantially correspond to an active area (a channel area) of a transistor. In other words, a portion of the semiconductor pattern may be the active area of the transistor, another portion of the semiconductor pattern may be a source area or a drain area of the transistor, and the other portion of the semiconductor pattern may be a connection electrode or a connection signal line.

Each of the pixels may have an equivalent circuit that includes seven transistors, one capacitor, and a light emitting element, and the equivalent circuit of the pixels may be changed in various ways. FIG. 3B shows one transistor 100PC and the light emitting element 100PE included in the pixel.

The source area SC, the active area AL, and the drain area DR of the transistor 100PC may be formed from the semiconductor pattern. The source area SC and the drain area DR may extend in opposite directions to each other from the active area AL in a cross-section. FIG. 3B shows a portion of a connection signal line SCL formed from the semiconductor pattern. In embodiments, the connection signal line SCL may be connected to the drain area DR of the transistor 100PC in a plane.

A first insulating layer 10 may be disposed on the buffer layer BFL. The first insulating layer 10 may commonly overlap the pixels and may cover the semiconductor pattern. The first insulating layer 10 may be, for example, an inorganic layer and/or an organic layer, and may have a single-layer or multi-layer structure. The first insulating layer 10 may include at least one of, for example, aluminum oxide, titanium oxide, silicon oxide, silicon nitride, silicon oxynitride, zirconium oxide, and hafnium oxide. In an embodiment, the first insulating layer may have a single-layer structure of a silicon oxide layer. Not only the first insulating layer 10, but also an insulating layer of the circuit layer 120 described later may, be an inorganic layer and/or an organic layer, and may have a single-layer or multi-layer structure. The inorganic layer may include at least one of the above-mentioned materials, however, the inorganic layer is not limited thereto.

A gate GT of the transistor 100PC may be disposed on the first insulating layer 10. The gate GT may be a portion of a metal pattern. The gate GT may overlap the active area AL.

The gate GT may be used as a mask in a process of doping the semiconductor pattern.

A second insulating layer 20 may be disposed on the first insulating layer 10 and may cover the gate GT. The second insulating layer 20 may commonly overlap the pixels. The second insulating layer 20 may be an inorganic layer and/or an organic layer, and may have a single-layer or multi-layer structure. The second insulating layer 20 may include at least one of, for example, silicon oxide, silicon nitride, and silicon oxynitride. In an embodiment, the second insulating layer 20 may have a multi-layer structure of a silicon oxide layer and a silicon nitride layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL via a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinafter, the organic light emitting element will be described as the light emitting element 100PE, however, the light emitting element is not limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 via a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The display area DA (refer to FIG. 1A) may include a light emitting area PXA and a non-light-emitting area NPXA adjacent to the light emitting area PXA. The non-light-emitting area NPXA may surround the light emitting area PXA. In an embodiment, the light emitting area PXA may be defined to correspond to the portion of the first electrode AE, which is exposed through the opening 70-OP.

The light emitting layer EL may be disposed on the first electrode AE. The light emitting layer EL may be disposed in an area corresponding to the opening 70-OP. That is, the light emitting layer EL may be formed in each of the pixels after being divided into a plurality of portions. In the case where the light emitting layer EL is formed in each of the pixels after being divided into plural portions, each of the light emitting layers EL may emit a light having at least one of blue, red, and green colors. However, embodiments are not limited thereto. According to an embodiment, the light emitting layer EL may be commonly provided over the pixels without being divided into a plurality of portions. In this case, the light emitting layer EL may provide a blue light or a white light.

The second electrode CE may be disposed on the light emitting layer EL. The second electrode CE may have an integral shape and may be commonly disposed over the pixels.

In an embodiment, a hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels using an open mask.

The encapsulation layer 140 may be disposed on the light emitting element layer 130. The encapsulation layer 140 may include, for example, an inorganic layer, an organic layer, and an inorganic layer, which are sequentially stacked. However, layers of the encapsulation layer 140 are not limited thereto.

The inorganic layers may protect the light emitting element layer 130 from moisture and oxygen, and the organic layer may protect the light emitting element layer 130 from a foreign substance such as, for example, dust particles. The inorganic layers may include, for example, a silicon nitride layer, a silicon oxynitride layer, a silicon oxide layer, a titanium oxide layer, or an aluminum oxide layer. The organic layer may include, for example, an acrylic-based organic layer. However, embodiments of the present disclosure are not limited thereto.

The input sensor IS may include a base layer 201, a first conductive layer 202, a sensing insulating layer 203, a second conductive layer 204, and a cover insulating layer 205.

The base layer 201 may be an inorganic layer that includes at least one of, for example, silicon nitride, silicon oxynitride, and silicon oxide. According to an embodiment, the base layer 201 may be an organic layer that includes an epoxy resin, an acrylic resin, or an imide-based resin. The base layer 201 may have a single-layer structure or a multi-layer structure of layers stacked in the third direction DR3.

Each of the first and second conductive layers 202 and 204 may have a single-layer structure or a multi-layer structure of layers stacked in the third direction DR3.

The conductive layer having the single-layer structure may include a metal layer or a transparent conductive layer. The metal layer may include, for example, molybdenum, silver, titanium, copper, aluminum, or alloys thereof. The transparent conductive layer may include a transparent conductive oxide such as, for example, indium tin oxide (ITO), indium zinc oxide (IZO), zinc oxide (ZnO), indium zinc tin oxide (IZTO), etc. In addition, the transparent conductive layer may include a conductive polymer such as, for example, PEDOT, metal nanowire, graphene, etc.

The conductive layer having the multi-layer structure may include metal layers. The metal layers may have a three-layer structure of titanium/aluminum/titanium. The conductive layer having the multi-layer structure may include at least one metal layer and at least one transparent conductive layer.

At least one of the sensing insulating layer 203 and the cover insulating layer 205 may include an inorganic layer. The inorganic layer may include at least one of, for example, aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of, for example, an acrylic-based resin, a methacrylic-based resin, a polyiso- prene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 4:
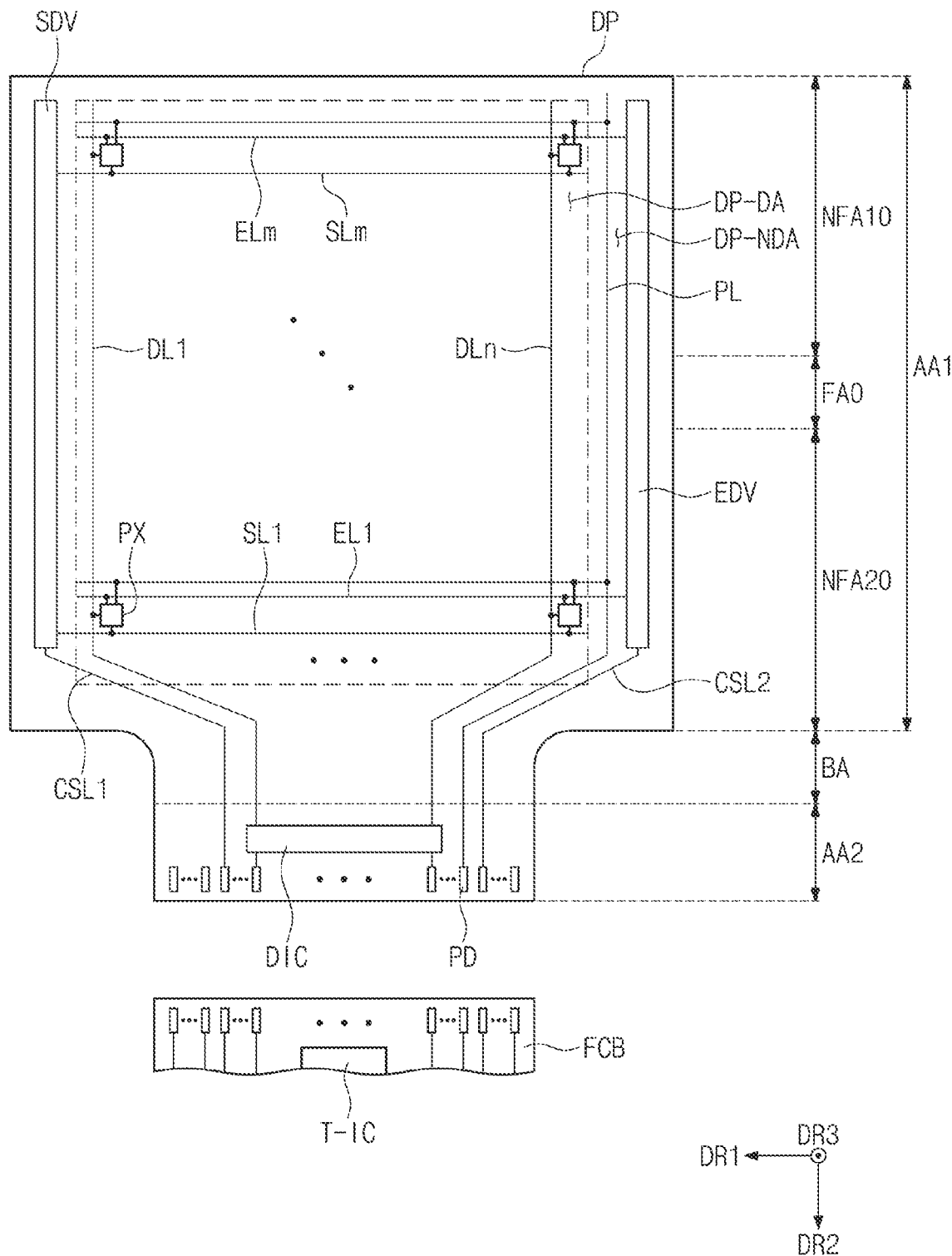
FIG. 4 is a plan view showing a display panel according to an embodiment of the present disclosure.

FIG. 4 is a plan view showing the display panel according to an embodiment of the present disclosure.

Referring to FIG. 4, the display panel DP may include the display area DP-DA and the non-display area DP-NDA around the display area DP-DA. The display area DP-DA and the non-display area DP-NDA may be distinguished from each other by a presence or absence of a plurality of pixels PX. For example, the pixels PX may be disposed in the display area DP-DA, and are not disposed in the non-display area DP-NDA. A scan driver SDV, a data driver, and an emission driver EDV may be disposed in the non-display area NDA. The data driver may be a circuit provided in the driving chip DIC.

The display panel DP may include a first panel area AA1, a bending area BA, and a second panel area AA2, which are defined along the second direction DR2. The second panel area AA2 and the bending area BA may be areas of the non-display area DP-NDA. The bending area BA may be defined between the first panel area AA1 and the second panel area AA2.

The first panel area AA1 may correspond to the display surface DS of FIG. 1A. The first panel area AA1 may include a first non-folding area NFA10, a second non-folding area NFA20, and a folding area FAO. The first non-folding area NFA10, the second non-folding area NFA20, and the folding area FAO may respectively correspond to the first non-folding area NFA1, the second non-folding area NFA2, and the folding area FA of FIGS. 1A and 1B.

A width (or a length) in the first direction DR1 of the bending area BA and a width (or a length) in the first direction DR1 of the second panel area AA2 may be smaller than a width (or a length) in the first direction DR1 of the first panel area AA1. An area having a relatively short length in a bending axis direction may be relatively easily bent.

The display panel DP may include the plurality of pixels PX, a plurality of scan lines SL1 to SLm, a plurality of data lines DL1 to DLn, a plurality of emission lines EL1 to ELm, first and second control lines CSL1 and CSL2, a power line PL, and a plurality of pads PD, in which each of m and n is a natural number. The pixels PX may be connected to the scan lines SL1 to SLm, the data lines DL1 to DLn, and the emission lines EL1 to ELm.

The scan lines SL1 to SLm may extend in the first direction DR1 and may be electrically connected to the scan driver SDV. The data lines DL1 to DLn may extend in the second direction DR2 and may be electrically connected to the driving chip DIC via the bending area BA. The emission lines EL1 to ELm may extend in the first direction DR1 and may be electrically connected to the emission driver EDV.

The power line PL may include a portion extending in the first direction DR1 and a portion extending in the second direction DR2. The portion extending in the first direction DR1 and the portion extending in the second direction DR2 may be disposed on different layers from each other. The portion of the power line PL, which extends in the second direction DR2, may extend to the second panel area AA2 via the bending area BA. The power line PL may provide a first voltage to the pixels PX.

The first control line CSL1 may be connected to the scan driver SDV and may extend to a lower end of the second panel area AA2 via the bending area BA. The second control line CSL2 may be connected to the emission driver EDV and may extend to the lower end of the second panel area AA2 via the bending area BA.

When viewed in a plane, the pads PD may be disposed adjacent to the lower end of the second panel area AA2. The driving chip DIC, the power line PL, the first control line CSL1, and the second control line CSL2 may be electrically connected to the pads PD. The flexible circuit film FCB may be electrically connected to the pads PD through, for example, an anisotropic conductive adhesive layer.

Figure 5A:
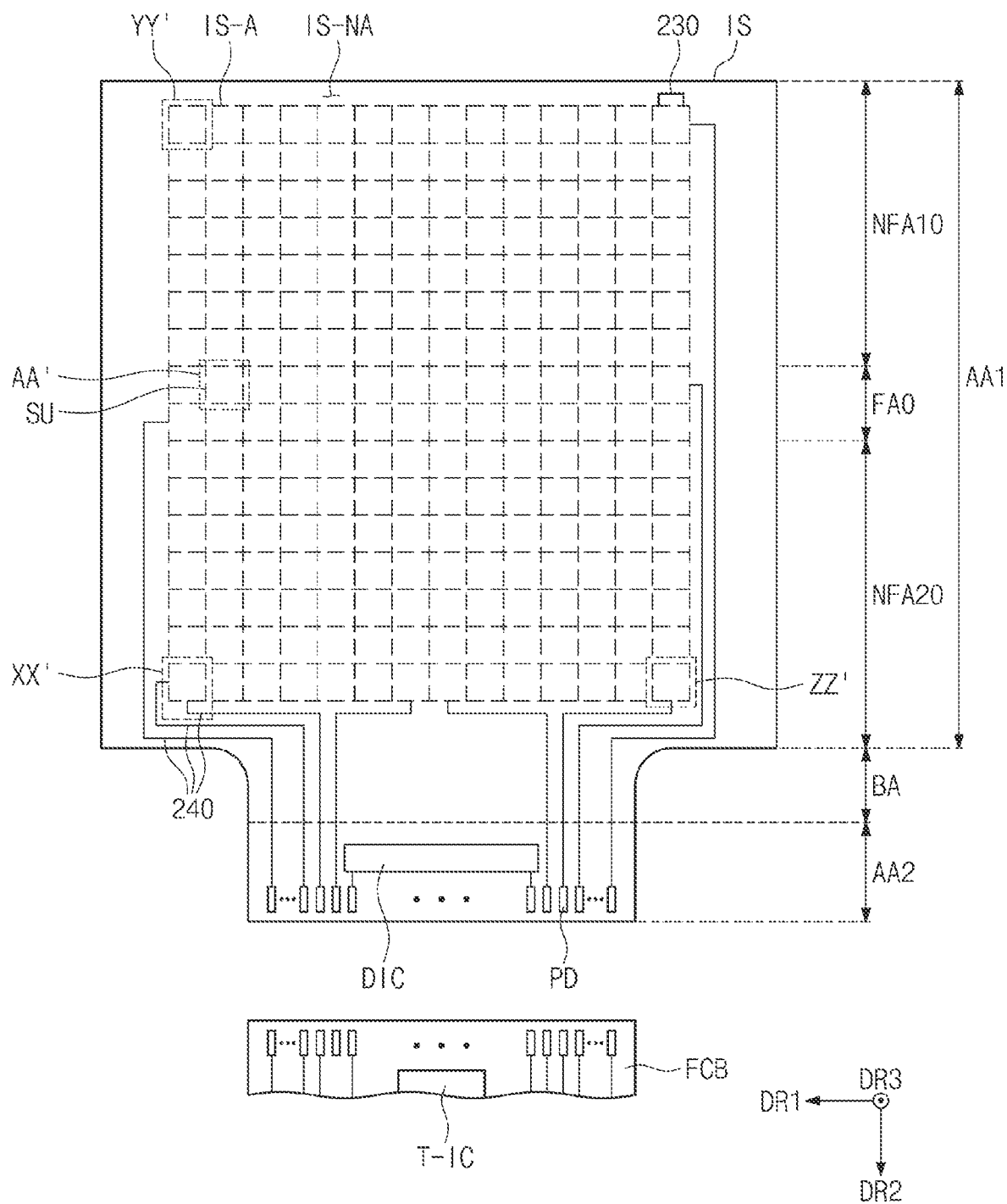
FIG. 5A is a plan view showing an input sensor according to an embodiment of the present disclosure.
Figure 5B:
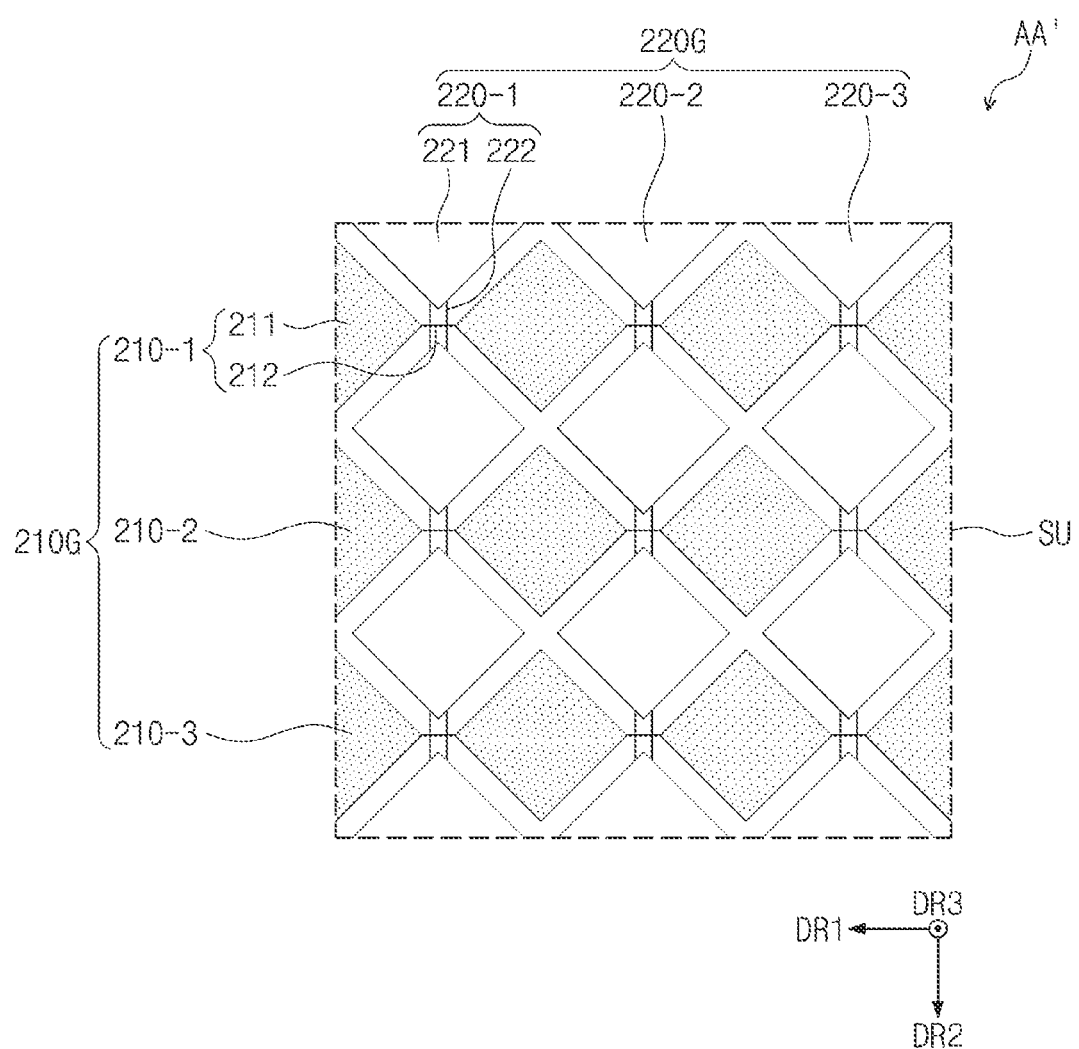
Figure 5C:
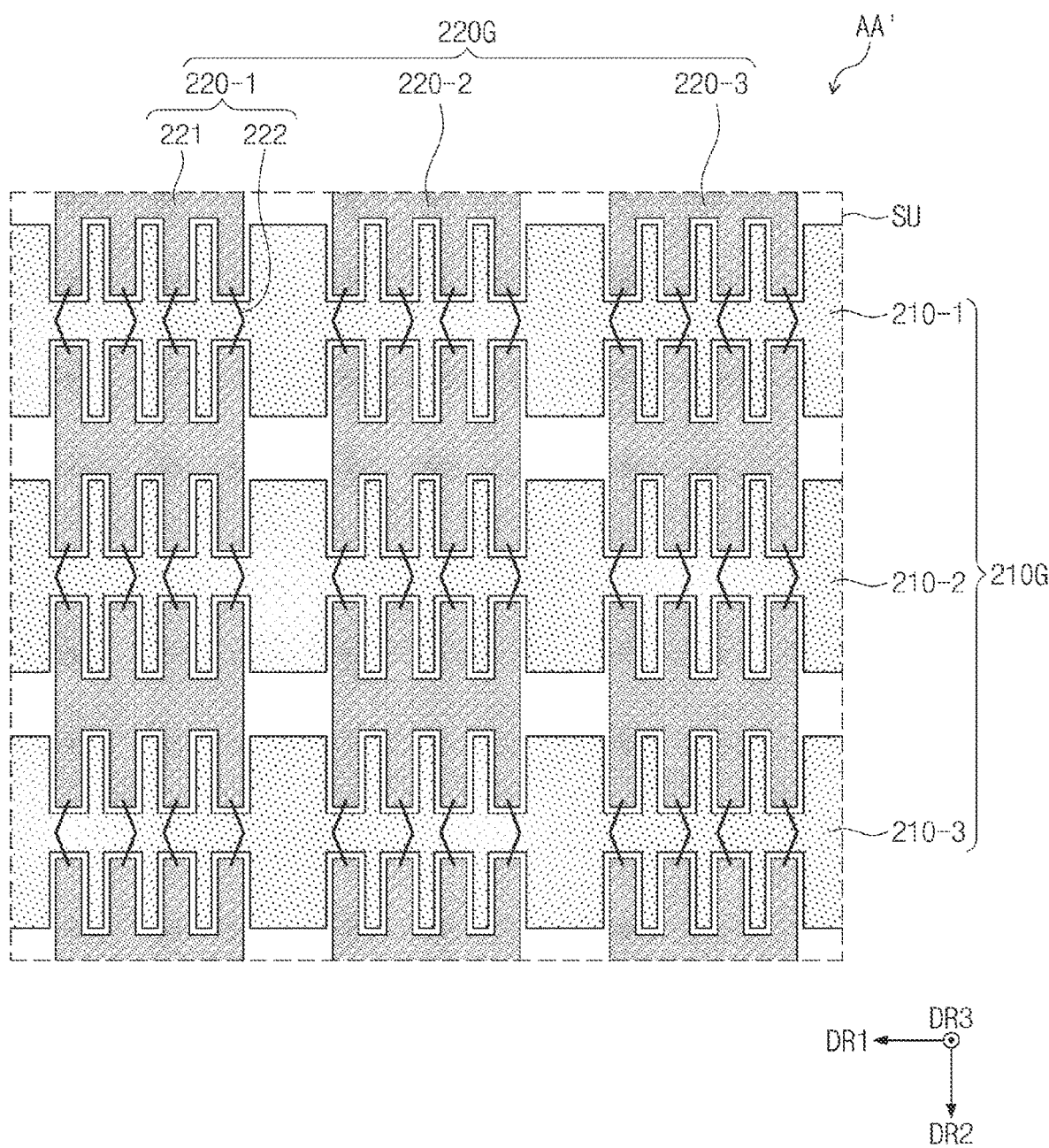

FIG. 5A is a plan view showing the input sensor according to an embodiment of the present disclosure. FIGS. 5B to 5D are enlarged views showing sensing electrodes in a sensing unit shown in FIG. 5A. FIGS. 5B to 5D are enlarged plan views showing an area AA' shown in FIG. 5A.

Referring to FIGS. 5A and 5B, the input sensor IS may include a sensing area IS-A and a peripheral area IS-NA, which are defined therein. The sensing area IS-A may be activated in response to electrical signals. As an example, the sensing area IS-A may be an area in which the external input is sensed. The peripheral area IS-NA may be defined adjacent to the sensing area IS-A and may surround the sensing area IS-A.

The input sensor IS may include first sensing electrodes 210-1, 210-2, and 210-3, second sensing electrodes 220-1, 220-2, and 220-3, first sensing lines 230, and second sensing lines 240.

The first sensing electrodes 210-1, 210-2, and 210-3 and the second sensing electrodes 220-1, 220-2, and 220-3 may be disposed in the sensing area IS-A, and the first sensing lines 230 and the second sensing lines 240 may be disposed in the peripheral area IS-NA. The input sensor IS may obtain information about the external input based on a variation in mutual capacitance between the first sensing electrodes 210-1, 210-2 and 210-3 and the second sensing electrodes 220-1, 220-2, and 220-3 crossing the first sensing electrodes 210-1, 210-2 and 210-3.

According to an embodiment, the input sensor IS may include first sensing electrode groups 210G and second sensing electrode groups 220G. The first sensing electrode groups 210G may extend in the first direction DR1 and may be arranged in the second direction DR2. The second sensing electrode groups 220G may extend in the second direction DR2 and may be arranged in the first direction DR1. Each of the first sensing electrode groups 210G may include the first sensing electrodes 210-1, 210-2, and 210-3. Each of the second sensing electrode groups 220G may include the second sensing electrodes 220-1, 220-2, and 220-3.

The input sensor IS may include a plurality of sensing units SU. Each of the sensing units SU may be defined as an area where the first sensing electrodes 210-1, 210-2, and 210-3 cross the second sensing electrodes 220-1, 220-2, and 220-3. In an embodiment, three first sensing electrodes 210-1, 210-2, and 210-3 cross three second sensing electrodes 220-1, 220-2, and 220-3 in one sensing unit SU. However, embodiments of the present disclosure are not limited thereto. As an example, two first sensing electrodes may cross two second sensing electrodes in one sensing unit SU. The first sensing electrode groups 210G and the second sensing electrode groups 220G may cross each other in the sensing unit SU.

Each of the first sensing electrodes 210-1, 210-2, and 210-3 may extend in the first direction DR1, and the first sensing electrodes 210-1, 210-2, and 210-3 may be arranged in the second direction DR2. Each of the first sensing electrodes 210-1, 210-2, and 210-3 may include a first portion 211 and a second portion 212. The second portion 212 may be disposed between two first portions 211 adjacent to each other.

The second sensing electrodes 220-1, 220-2, and 220-3 may be arranged in the first direction DR1, and each of the second sensing electrodes 220-1, 220-2, and 220-3 may extend in the second direction DR2. The second sensing electrodes 220-1, 220-2, and 220-3 may include patterns 221 and connection patterns 222 (or bridge patterns). The connection patterns 222 may electrically connect two patterns 221 adjacent to each other. The two patterns 221 adjacent to each other may be connected to each other by two connection patterns 222. However, embodiments of the present disclosure are not limited thereto. The second portion 212 may be insulated from the two connection patterns 222 while crossing the two connection patterns 222.

The patterns 221, the first portions 211, and the second portions 212 may be disposed on the same layer as each other, and the connection patterns 222 may be disposed on a layer different from the layer on which the patterns 221, the first portions 211, and the second portions 212 are disposed. As an example, the patterns 221, the first portions 211, and the second portions 212 may be included in the second conductive layer 204 (refer to FIG. 3B), the connection patterns 222 may be included in the first conductive layer 202 (refer to FIG. 3B), and this structure may be referred to as a bottom bridge structure. However, embodiments of the present disclosure are not limited thereto. As an example, the patterns 221, the first portions 211, and the second portions 212 may be included in the first conductive layer 202 (refer to FIG. 3B), the connection patterns 222 may be included in the second conductive layer 204 (refer to FIG. 3B), and this structure may be referred to as a top bridge structure. A detailed description of the cross-sectional structure of the input sensor IS will be described with reference to FIGS. 5E and 5F.

A lozenge shape and an arrangement relation of the first sensing electrodes 210-1, 210-2, and 210-3 and the second sensing electrodes 220-1, 220-2, and 220-3 shown in FIG. 5B are merely examples, and the shape and the arrangement relation of the first sensing electrodes 210-1, 210-2, and 210-3 and the second sensing electrodes 220-1, 220-2, and 220-3 forming the input sensor IS are not limited to those of FIG. 5B.

According to an embodiment, each of the first sensing electrode groups 210G may include n first sensing electrodes 210-1, 210-2, and 210-3 adjacent to each other, and each of the second sensing electrode groups 220G may include m second sensing electrodes 220-1, 220-2, and 220-3 adjacent to each other, in which n and m may be the same natural numbers as each other or different natural numbers from each other. That is, the number of the first sensing electrodes 210-1, 210-2, and 210-3 included in each of the first sensing electrode groups 210G may be different from the number of the second sensing electrodes 220-1, 220-2, and 220-3 included in each of the second sensing electrode groups 220G.

Each of the first sensing lines 230 may electrically connect the first sensing electrodes 210-1, 210-2, and 210-3 adjacent to each other. Each of the first sensing lines 230 may electrically connect the second sensing electrodes 220-1, 220-2, and 220-3 adjacent to each other. Each of the first sensing lines 230 may be connected to first ends of the first sensing electrodes 210-1, 210-2, and 210-3 and first ends of the second sensing electrodes 220-1, 220-2, and 220-3. The first sensing lines 230 may be disposed in the peripheral area IS-NA. The first sensing lines 230 may be connected to the first sensing electrode groups 210G in a one-to-one correspondence. The first sensing lines 230 may electrically connect first ends of the first sensing electrodes 210-1, 210-2, and 210-3 to each other, which are disposed in the first sensing electrode groups 210G.

The first sensing lines 230 may be connected to the second sensing electrode groups 220G in a one-to-one correspondence. The first sensing lines 230 may electrically connect first ends of the second sensing electrodes 220-1, 220-2, and 220-3 to each other, which are disposed in the second sensing electrode groups 220G. FIG. 5A shows only one of the first sensing lines 230. However, between both ends of each of the first sensing electrodes 210-1, 210-2, and 210-3 and each of the second sensing electrodes 220-1, 220-2, and 220-3, the first sensing lines 230 may be connected to all first ends, which are opposite to second ends to which the second sensing lines 240 are connected.

The second sensing lines 240 may be disposed in the peripheral area IS-NA. The second sensing lines 240 may be connected to the second ends of the first sensing electrodes 210-1, 210-2, and 210-3 and the second sensing electrodes 220-1, 220-2, and 220-3, respectively. The second ends may be opposite to the first ends of the first sensing electrodes 210-1, 210-2, and 210-3 and the second sensing electrodes 220-1, 220-2, and 220-3, which are connected to the first sensing lines 230.

As an example, the one end of each of the first sensing electrode groups 210G extending in the first direction DR1 may be connected to the first sensing line 230, and the other end of each of the first sensing electrode groups 210G may be connected to the second sensing line 240. In addition, the one end of each of the second sensing electrode groups 220G extending in the second direction DR2 may be connected to the first sensing line 230, and the other end of each of the second sensing electrode groups 220G extending in the second direction DR2 may be connected to the second sensing line 240.

The second sensing lines 240 may be electrically connected to corresponding pads among the pads PD, respectively. The second sensing lines 240 may connect the first sensing electrode groups 210G and the second sensing electrode groups 220G to a driving circuit T-IC via the pads. The second sensing lines 240 may include a switch. Details thereof will be described with reference to FIGS. 8A to 9B.

The driving circuit T-IC may drive the input sensor IS. The driving circuit T-IC may be electrically connected to the input sensor IS, and may provide a driving signal to the input sensor IS and may calculate coordinates from the external input. The driving circuit T-IC may be mounted on the flexible circuit board FCB.

The driving circuit T-IC may generate a control signal based on a type of input applied to the input sensor IS. According to an embodiment, in a case where a touch event occurs on the input sensor IS by a user's body (e.g., where the user uses a body part such as, for example, a finger, to provide input to the input sensor IS), the driving circuit T-IC may generate a first control signal, and the driving circuit T-IC may generate a second control signal when an input from an input device such as, for example, an electronic pen is sensed. The generated first and second control signals may be applied to the input sensor IS. The second sensing lines 240 may connect the first sensing electrodes 210-1, 210-2, and 210-3 and the second sensing electrodes 220-1, 220-2, and 220-3 to the driving circuit T-IC or a reference electric potential in response to the first control signal and the second control signal. This will be described in further detail below.

According to an embodiment, each of the first sensing electrode groups 210G may form a closed-loop by the first sensing line 230, the first sensing electrodes 210-1, 210-2, and 210-3, and the second sensing line 240. Each of the second sensing electrode groups 220G may form a closed-loop by the first sensing line 230, the second sensing electrodes 220-1, 220-2, and 220-3, and the second sensing line 240. That is, a current induced by an input device PN (refer to FIG. 6) may flow through the closed-loop. The induced current may flow through the driving circuit T-IC or the reference electric potential.

FIGS. 5C and 5D are enlarged plan views showing the area AA' shown in FIG. 5A. FIGS. 5C and 5D show first sensing electrodes 210-1, 210-2, and 210-3 and second sensing electrodes 220-1, 220-2, and 220-3, which have a shape different from that of FIG. 5B. In FIG. the first sensing electrodes 210-1, 210-2, and 210-3 and the second sensing electrodes 220-1, 220-2, and 220-3 may have a bar shape. In FIG. 5D, the first sensing electrodes 210-1, 210-2, and 210-3 and the second sensing electrodes 220-1, 220-2, and 220-3 may have a complex shape. The shape of the first sensing electrodes 210-1, 210-2, and 210-3 and the second sensing electrodes 220-1, 220-2, and 220-3 are not limited to those of FIGS. 5B to 5D.

In FIGS. 5C and 5D, each of the first sensing electrodes 210-1, 210-2, and 210-3 may extend in the first direction DR1, and the first sensing electrodes 210-1, 210-2, and 210-3 may be arranged in the second direction DR2. The second sensing electrodes 220-1, 220-2, and 220-3 may be arranged in the first direction DR1, and each of the second sensing electrodes 220-1, 220-2, and 220-3 may extend in the second direction DR2.

In FIG. 5C, the second sensing electrodes 220-1, 220-2, and 220-3 may include patterns 221 and connection patterns 222 (or bridge patterns). The connection patterns 222 may electrically connect two patterns 221 adjacent to each other. Two patterns 221 adjacent to each other may be connected to each other by two connection patterns 222. However, embodiments of the present disclosure are not limited thereto. One of the first sensing electrodes 210-1, 210-2, and 210-3 may be insulated from the two connection patterns 222 while crossing the two connection patterns 222. In an embodiment, the shape in which the first sensing electrodes 210-1, 210-2, and 210-3 are engaged with the patterns 221 is shown as a representative example. However, embodiments of the present disclosure are not limited thereto. In FIG. 5D, details of first and second portions 211 and 212, patterns 221, and connection patterns 222 are the same as those described with reference to FIG. 5B. Thus, for convenience of explanation, a further description thereof is omitted.

The first sensing electrodes 210-1, 210-2, and 210-3 and the second sensing electrodes 220-1, 220-2, and 220-3 described with reference to FIGS. 5B to 5D may have a mesh structure. In this case, each of the first sensing electrodes 210-1, 210-2, and 210-3 and each of the second sensing electrodes 220-1, 220-2, and 220-3 may be provided with an opening. However, embodiments of the present disclosure are not limited thereto. According to an embodiment, each of the first sensing electrodes 210-1, 210-2, and 210-3 and each of the second sensing electrodes 220-1, 220-2, and 220-3 may be a transparent electrode through which no opening is defined.

Figure 5E:
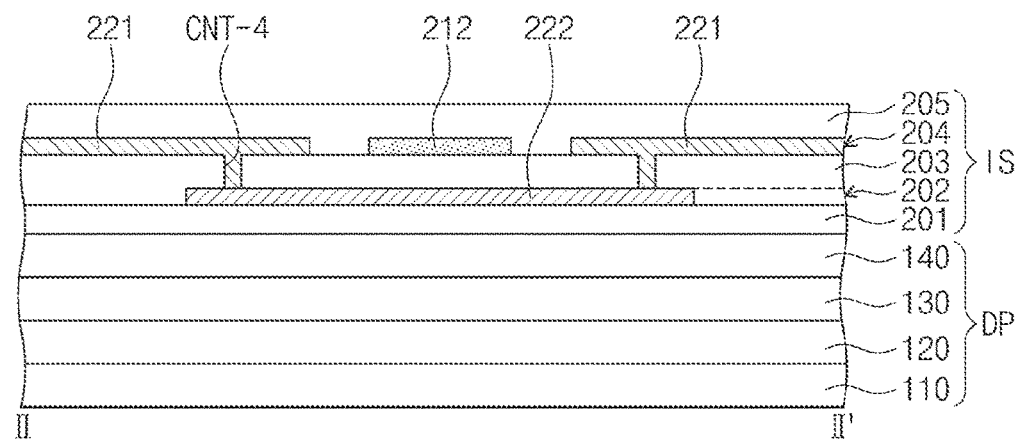
FIGS. 5E and 5F are cross-sectional views showing input sensors according to embodiments of the present disclosure.
Figure 5E:
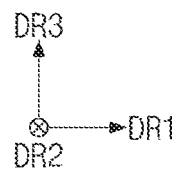
Figure 5F:
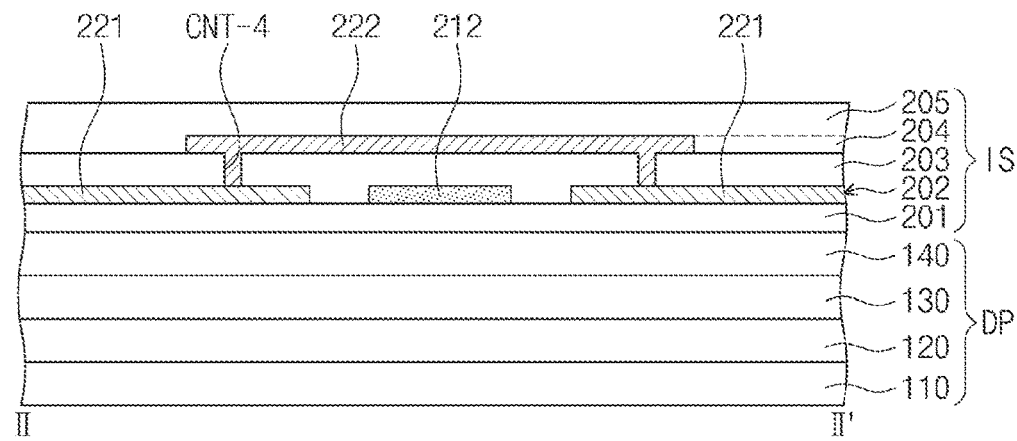
Figure 5F:
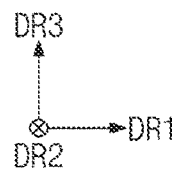

FIGS. 5E and 5F are cross-sectional views showing input sensors according to embodiments of the present disclosure.

FIGS. 5E and 5F show cross-sections taken along line II-II' of FIG. 5D, respectively. FIG. 5E shows the bottom bridge structure, and FIG. 5F shows the top bridge structure. The plan views of the input sensor IS described hereinafter show the top bridge structure, however, they are not limited thereto. According to an embodiment, the structure of the input sensor IS may include the bottom bridge structure of FIG. 5E.

In FIG. 5E, the first conductive layer 202 may include the connection pattern 222. The second conductive layer 204 may include the patterns 221 and the second portion 212. The connection pattern 222 may be electrically connected to the patterns 221 via a contact hole CNT-4.

In FIG. 5F, the first conductive layer 202 may include the patterns 221 and the second portion 212. The second conductive layer 204 may include the connection pattern 222. The connection pattern 222 may be electrically connected to the patterns 221 via the contact hole CNT-4.

Figure 6:
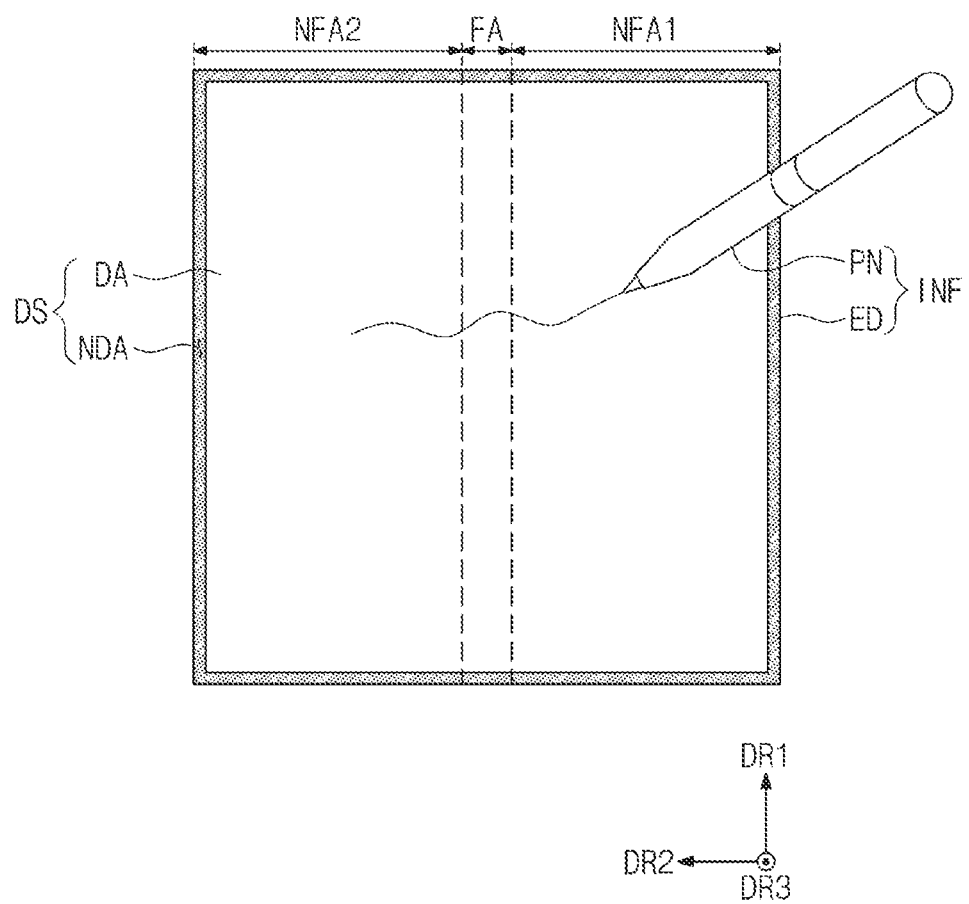
FIG. 6 is a plan view showing an electronic device with an input device according to an embodiment of the present disclosure.

FIG. 6 is a plan view showing an electronic device ED with the input device PN according to an embodiment of the present disclosure.

Referring to FIG. 6, the electronic device ED may be, for example, an electronic system, a touch system, an input/output system, a digitizer system, a pen tablet, or a pen terminal.

The input device PN may be a device that generates a magnetic field of a predetermined resonant frequency. The input device PN may be configured to transmit an output signal based on an electromagnetic resonance method. The input device PN may be, for example, a pen, an input pen, a magnetic pen, a stylus pen, or an electromagnetic resonance pen.

The input device PN may include a signal generator that generates an alternating current power therein. In this case, the input device PN may generate an induced current using an internal signal generator even though there is no external magnetic field provided from the outside. Accordingly, although the electronic device ED does not include a digitizer that forms an electric field according to embodiments, the electronic device ED may sense an input from the input device PN that outputs the electric field.

The input device PN may be operated in either an active type or a passive type according to whether the electronic device ED includes the digitizer. Accordingly, an input device with increased performance that may be used in various environments may be provided.

The input device PN driven by the electromagnetic resonance method may have increased output efficiency compared to that of an active electrostatic pen (hereinafter, referred to as an AES pen). As an example, when a Tx signal applied to the input device PN and a Tx signal applied to the AES pen have the same frequency, e.g., about 1.8 MHz, and the same input voltage, e.g., about 17 V, an intensity of a signal output from the input device PN may be about 40 times stronger than an intensity of a signal output from the AES pen. In addition, an intensity of an output signal from the input device PN when the Tx signal having a frequency of about 1.8 MHz and a voltage of about 1 V is applied to the input device PN may be similar to an intensity of an output signal from the AES pen when the Tx signal having a frequency of about 1.8 MHz and a voltage of about 17 V is applied to the AES pen. Accordingly, the input device PN operated in an active mode may consume less battery than the AES pen.

In addition, in a case where the input device PN is applied to the electronic device ED, in an embodiment, the electronic device ED does not include the digitizer. Accordingly, an increase in thickness and weight and a decrease in flexibility of the electronic device ED due to the addition of the digitizer may be prevented according to embodiments of the present disclosure. The electronic device ED from which the digitizer is omitted may sense the input from the input device PN using the input sensor IS (refer to FIG. 3A).

Figure 7:
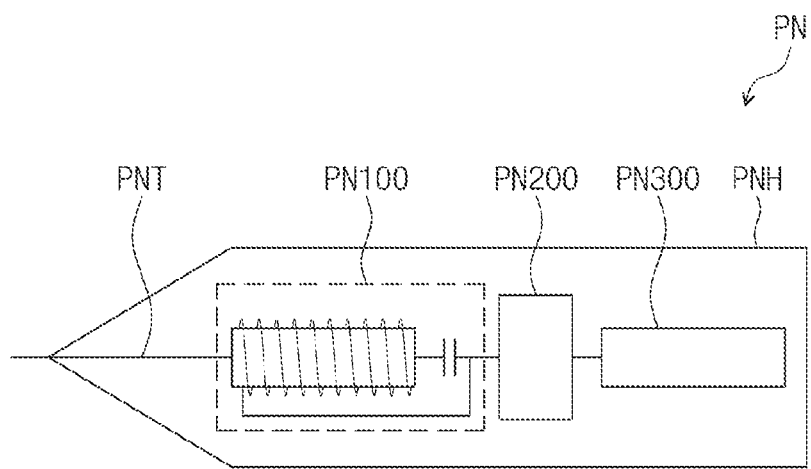
FIG. 7 is a block diagram showing an input device according to an embodiment of the present disclosure.

FIG. 7 is a block diagram showing the input device PN according to an embodiment of the present disclosure.

Referring to FIG. 7, the input device PN may include a housing PNH, a pen tip PNT, a resonant circuit PN100, a signal generator PN200, and a power supply PN300.

The housing PNH may have a pen shape and may include an accommodation space defined therein. The resonant circuit PN100, the signal generator PN200, and the power supply PN300 may be accommodated in the accommodation space defined in the housing PNH. The pen tip PNT may be disposed at an end of the housing PNH. As an example, a portion of the pen tip PNT may be exposed to the outside of the housing PNH, and the other portion of the pen tip PNT may be inserted into the housing PNH.

The resonant circuit PN100 may be a resonant circuit including an inductor and a capacitor. The capacitor may store a current flow by a signal (or the Tx signal) as an electric field, and the inductor may store the current flow by the signal as a magnetic field. The inductor may include a magnetic material and a coil wound around the magnetic material.

The signal generator PN200 may generate the signal (or the Tx signal). The signal generator PN200 may include an integrated circuit for a specific purpose or an oscillator. The signal generator PN200 may output an alternating signal with a predetermined frequency. As an example, the signal generated by the signal generator PN200 may be a fixed frequency signal. The signal may be a sine wave of about 560 kHz. However, the signal is not limited thereto.

The resonant circuit PN100 may be charged by the signal generator PN200. Accordingly, the signal generator PN200 may stop applying the signal after the resonant circuit PN100 is charged. The induced current may be generated in the resonant circuit PN100 by the signal, and the resonant circuit PN100 may resonate by the induced current to emit the magnetic field.

The power supply PN300 may supply power to the signal generator PN200. The power supply PN300 may include a battery or a high capacity capacitor.

According to an embodiment, since the input device PN includes the signal generator PN200 therein, the input device PN may be operated not only in the passive type, but also in the active type. Accordingly, although the electronic device ED (refer to FIG. 6) does not include a digitizer that forms the magnetic field, the electronic device ED may sense an input of the input device PN that outputs the magnetic field.

Figure 8A:
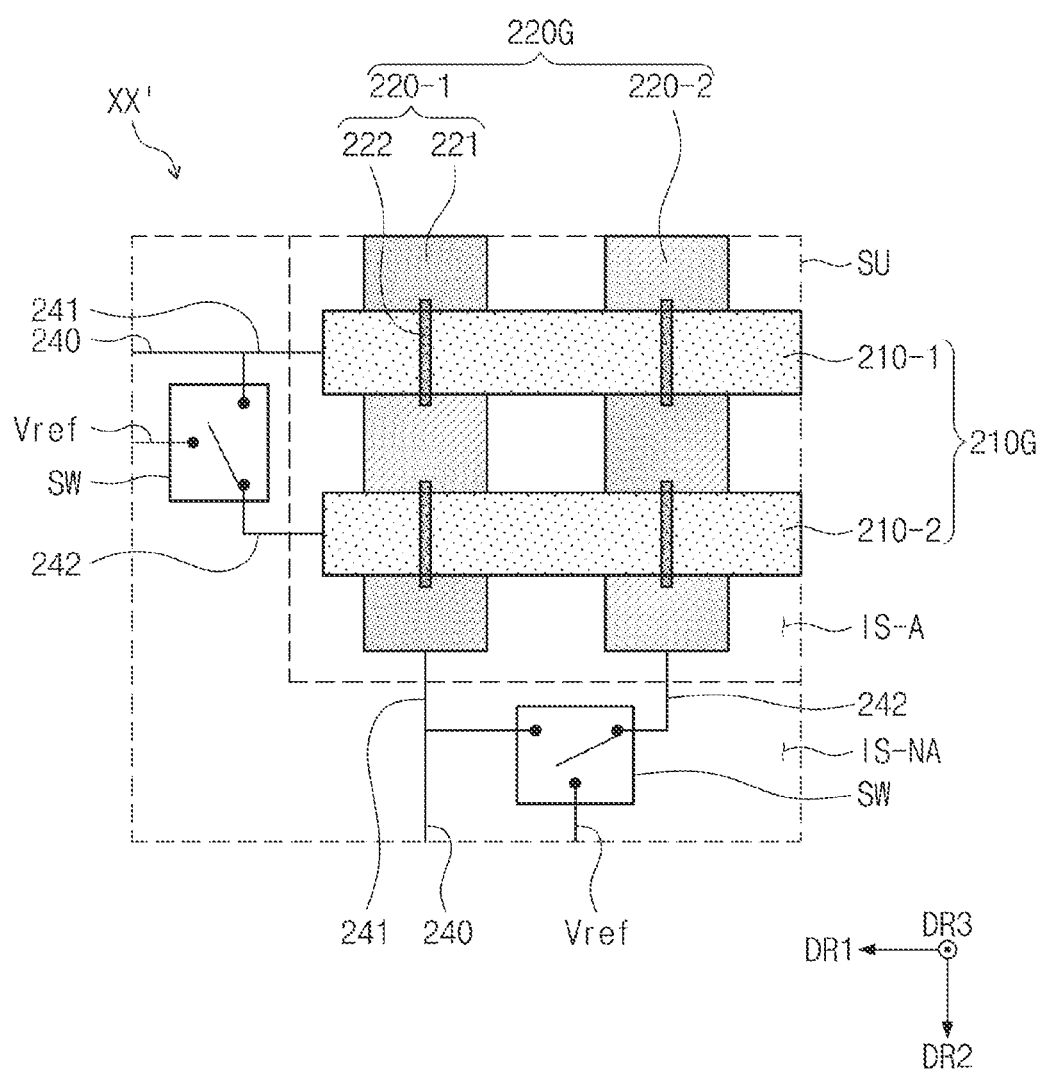
FIGS. 8A to 8C are views showing sensing lines according to embodiments of the present disclosure.
Figure 8B:
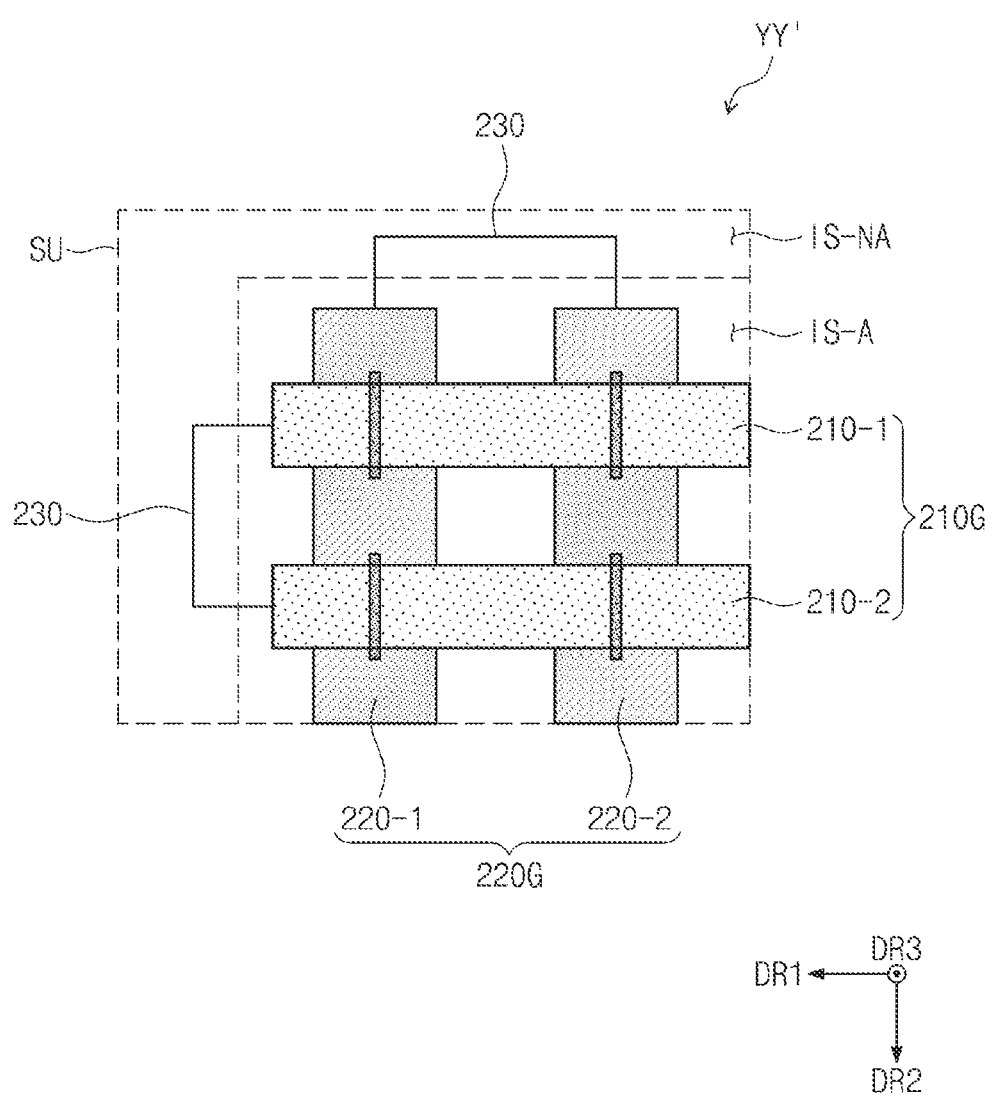
Figure 8C:
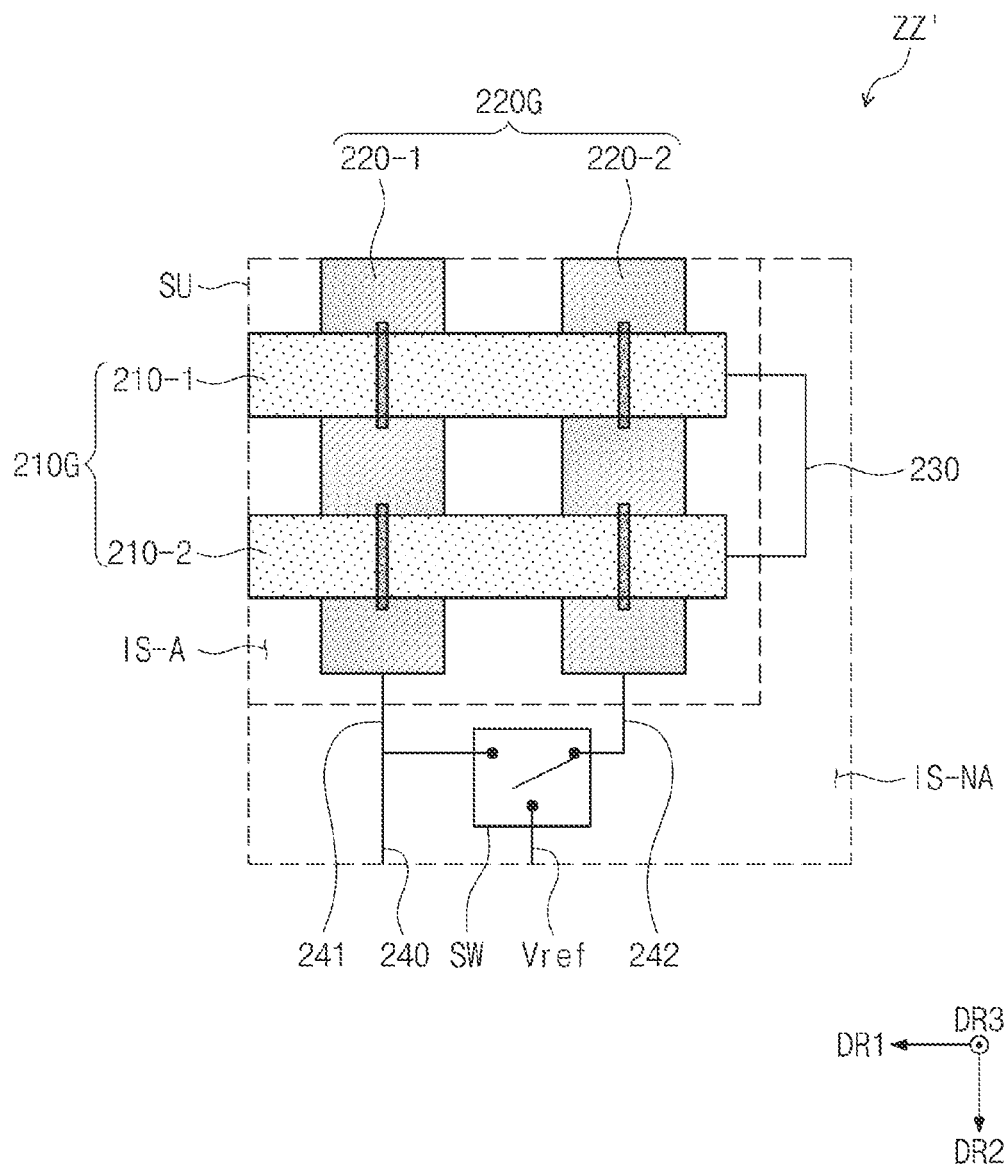

FIGS. 8A to 8C are views showing sensing lines according to an embodiment of the present disclosure.

In FIGS. 8A to 8C, the first sensing electrode group 210G may include two first sensing electrodes 210-1 and 210-2, and the second sensing electrode group 220G may include two second sensing electrodes 220-1 and 220-2. The first sensing electrode group 210G and the second sensing electrode group 220G are schematically shown as having a bar shape. FIGS. 8A to 8C show one sensing unit SU including the first sensing electrode group 210G and the second sensing electrode group 220G crossing the first sensing electrode group 210G.

FIG. 8A is an enlarged plan view showing an area XX' of FIG. 5A. FIG. 8A shows the second sensing lines 240.

As shown in FIG. 8A, the second sensing lines 240 may be connected to one end of the first sensing electrode group 210G and one end of the second sensing electrode group 220G.

According to an embodiment, the first sensing electrode group 210G and the second sensing electrode group 220G may be connected to the driving circuit T-IC. According to an embodiment, the first sensing electrode group 210G and the second sensing electrode group 220G may be connected to the driving circuit T-IC and the reference electric potential Vref.

According to an embodiment, the first sensing electrode group 210G may include a first adjacent sensing electrode 210-1 and a second adjacent sensing electrode 210-2 adjacent to the first adjacent sensing electrode 210-1. The second sensing electrode group 220G may include a first adjacent sensing electrode 220-1 and a second adjacent sensing electrode 220-2 adjacent to the first adjacent sensing electrode 220-1. Hereinafter, the sensing lines will be described based on the first sensing electrode group 210G. The same explanation may be applied to the second sensing electrode group 220G.

Referring to FIG. 8C, the first adjacent sensing electrode 210-1 and the second adjacent sensing electrode 210-2 may be electrically connected to each other at the second ends opposite to the first ends via the first sensing line 230 (refer to FIG. 5A).

The second sensing line 240 may include a first line 241 and a second line 242. The first line 241 may be connected to the first adjacent sensing electrode 210-1, and the second line 242 may be connected to the second adjacent sensing electrode 210-2. The first line 241 may connect the first adjacent sensing electrode 210-1 to the driving circuit T-IC. The second line 242 may selectively connect the second adjacent sensing electrode 210-2 to the driving circuit T-IC or the reference electric potential Vref. According to an embodiment, the second sensing line 240 may include a switch SW on the second line 242. The switch SW may selectively connect the second adjacent sensing electrode 210-2 to the driving circuit T-IC or the reference electric potential Vref. In this case, the reference electric potential Vref may correspond to a predetermined specific electric potential and may be greater than a ground electric potential.

According to an embodiment, in a case where the input sensor IS senses the input device PN (refer to FIG. 6) and the first control signal is generated by the driving circuit T-IC, the second line 242 of the second sensing line 240 may connect the second adjacent sensing electrode 210-2 to the reference electric potential Vref via the switch SW. In a case where the input sensor IS senses the user's touch and the second control signal is generated by the driving circuit T-IC, the switch SW of the second line 242 may connect the second adjacent sensing electrode 210-2 to the driving circuit T-IC.

According to an embodiment, the switch SW may be disposed in the peripheral area IS-NA. However, embodiments of the present disclosure are not limited thereto. According to an embodiment, the switch SW may be disposed on the flexible circuit board FCB (refer to FIG. 5A) to be adjacent to the driving circuit T-IC.

FIG. 8B is an enlarged plan view showing an area YY' of FIG. 5A. FIG. 8B shows the first sensing lines 230 according to an embodiment.

In FIG. 8B, the first sensing electrode group 210G may include the first adjacent sensing electrode 210-1 and the second adjacent sensing electrode 210-2, and the second sensing electrode group 220G may include the first adjacent sensing electrode 220-1 and the second adjacent sensing electrode 220-2. The first adjacent sensing electrodes 210-1 and 220-1 may be connected to the second adjacent sensing electrodes 210-2 and 220-2, respectively, by the first sensing line 230.

Referring to FIGS. 5A, 8A, and 8B, the second sensing electrode group 220G may include the first adjacent sensing electrode 220-1 and the second adjacent sensing electrode 220-2 electrically connected to the first adjacent sensing electrode 220-1 at first ends thereof by the first sensing line 230. The first adjacent sensing electrode 220-1 and the second adjacent sensing electrode 220-2 may be connected to the second sensing line 240 at the second ends thereof opposite to the first ends to which the first sensing line 230 is connected. The second sensing line 240 may connect one of the first adjacent sensing electrode 210-1 and the second adjacent sensing electrode 210-2 to the driving circuit T-IC, and may selectively connect the other of the first adjacent sensing electrode 210-1 and the second adjacent sensing electrode 210-2 to the driving circuit T-IC or the reference electric potential Vref.

The second sensing electrode group 220G may form a closed-loop defined by the first adjacent sensing electrode 220-1, the second adjacent sensing electrode 220-2, the first sensing line 230, and the second sensing line 240. According to an embodiment, the second sensing line 240 may be connected to the driving circuit T-IC and the reference electric potential Vref, and the closed-loop may include the driving circuit T-IC and the reference electric potential Vref.

According to an embodiment, when the input device PN is sensed by the input sensor IS, the induced current induced by the magnetic field of the input device PN may be generated on the closed-loop connected to the reference electric potential Vref. When the user touch is sensed, the induced current may flow through the closed-loop connected to only the driving circuit T-IC. When the input device PN is sensed, the resistance component of the input sensor IS may be relatively reduced, and the resistance acting on the input device PN may be reduced.

FIG. 8C is an enlarged plan view showing an area ZZ' of FIG. 5A. FIG. 8C shows the first sensing lines 230 and the second sensing lines 240 according to an embodiment.

FIG. 8C shows an opposite end of the first sensing electrode group 210G of FIG. 8A. Referring to FIGS. 5A, 8A, and 8C, the first sensing electrode group 210G may include the first adjacent sensing electrode 210-1 and the second adjacent sensing electrode 210-2, which are connected to each other at the first ends thereof by the first sensing line 230. The first adjacent sensing electrode 210-1 and the second adjacent sensing electrode 210-2 may be connected to the driving circuit T-IC and the reference electric potential Vref at the second ends thereof by the second sensing line 240.

That is, the first sensing electrode group 210G may form the closed-loop defined by the first sensing line 230, the first adjacent sensing electrode 210-1, the second adjacent sensing electrode 210-2, and the second sensing line 240. According to an embodiment, when the user touch is sensed, the closed-loop connected to the driving circuit T-IC may be formed, and when the input device PN is sensed, the closed-loop connected to the driving circuit T-IC and the reference electric potential Vref may be formed. When the input device PN is sensed, the second adjacent sensing electrode 210-2 may be connected to the reference electric potential Vref. Thus, the resistance component of the input sensor IS may be reduced, and the resistance acting on the input device PN may be reduced.

Figure 9A:
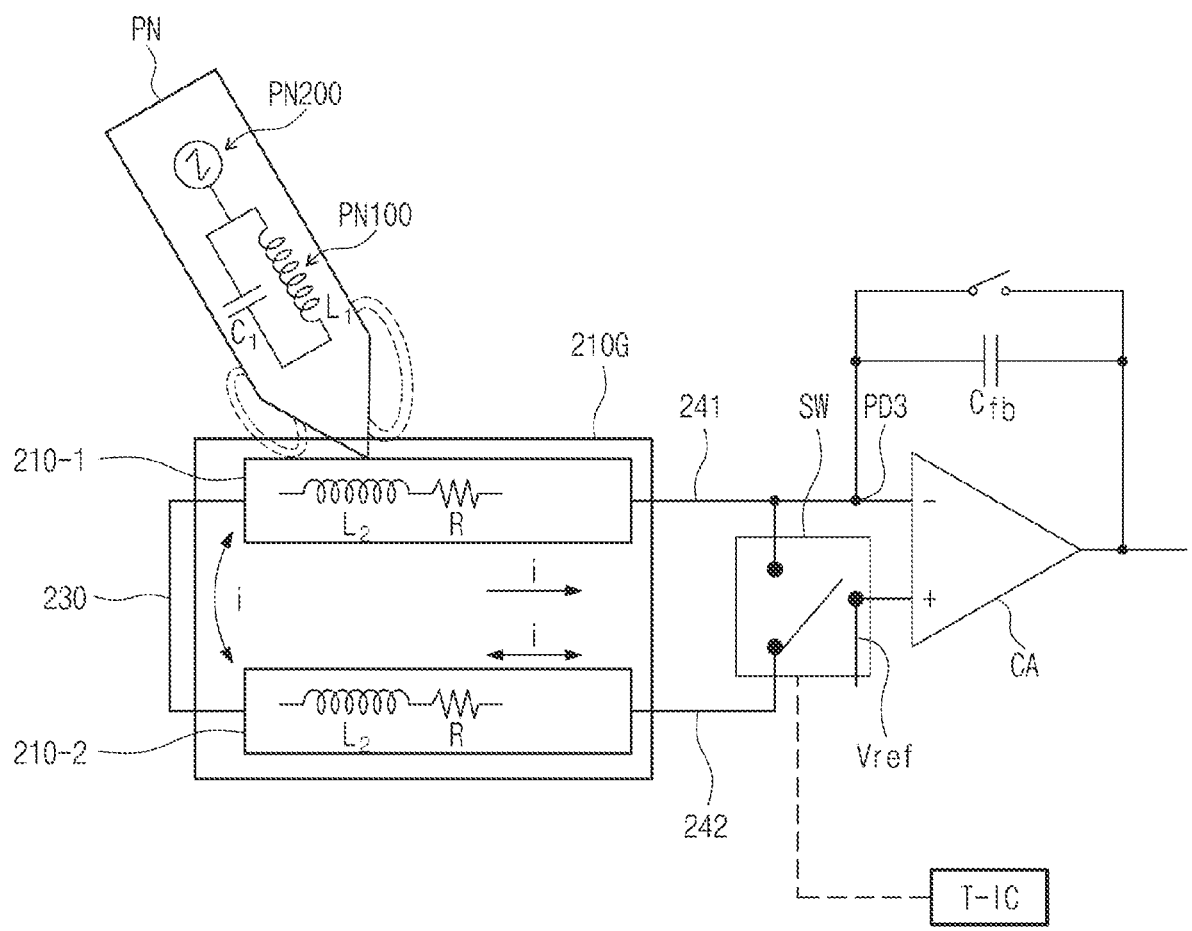
FIGS. 9A and 9B are views showing an operation of an input sensor according to an embodiment of the present disclosure.
Figure 9B:
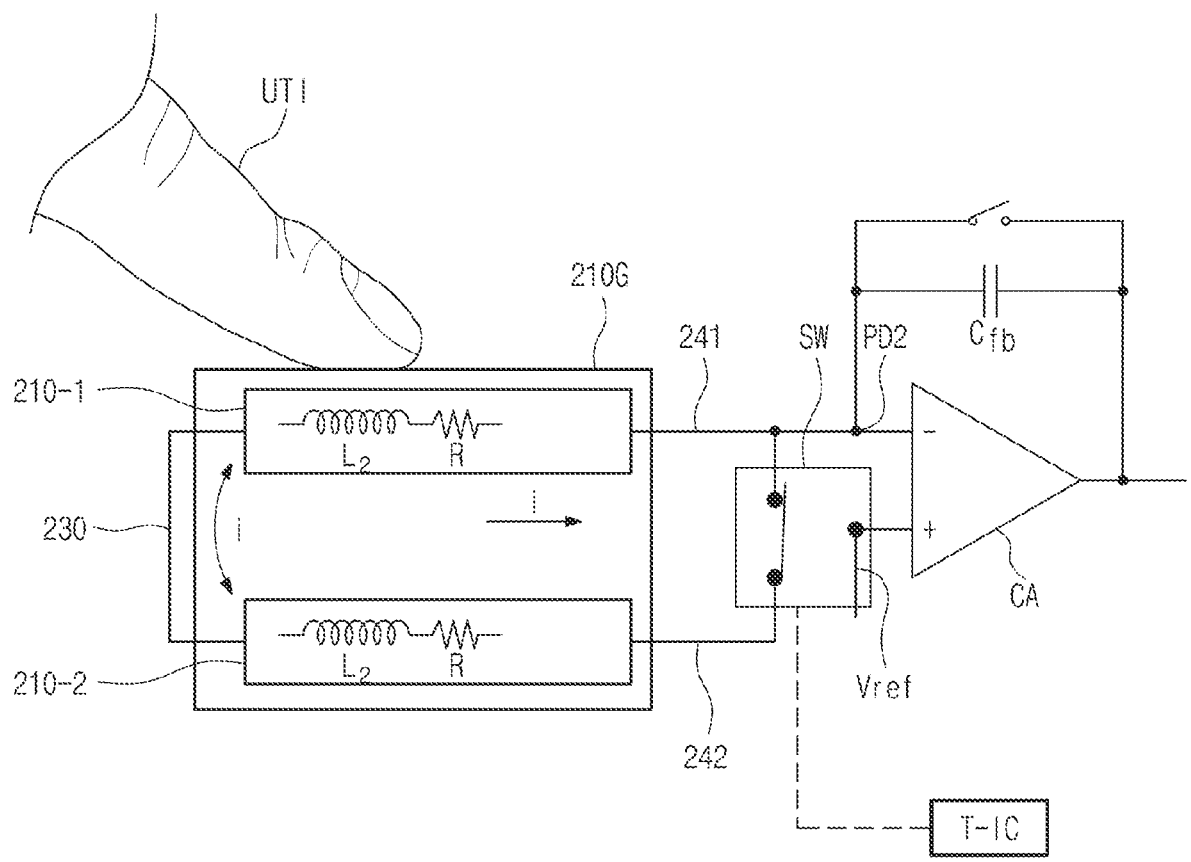

FIGS. 9A and 9B are views showing an operation of an input sensor according to an embodiment of the present disclosure. In FIGS. 9A and 9B, the operation of the input sensor will be described with reference to FIG. 7.

FIG. 9A shows an operation of the input sensor IS in a pen sensing mode in which the input generated by the input device PN is sensed. The inductor $L_1$ and the capacitor $C_1$ in the input device PN are shown in FIG. 9A, but the embodiment is not limited thereto. FIG. 9B shows an operation of the input sensor IS in a touch mode in which the input generated by the user touch UTI is sensed.

In FIGS. 9A and 9B, the first sensing electrode group 210G may sense the input generated by the input device PN or the user touch UTI. The first sensing electrode group 210G is shown as a representative example. The driving circuit T-IC may receive a sensing signal, which is caused by the input device PN or the user touch UTI, from the first adjacent sensing electrode 210-1 and the second adjacent sensing electrode 210-2 of the first sensing electrode group 210G.

A charge amplifier CA may receive an electrical signal that varies depending on whether the input generated by the user touch UTI is provided or the input generated by the input device PN is provided, and may output the electrical signal as the sensing signal. An inverting input of the charge amplifier CA may be electrically connected to the first adjacent sensing electrode 210-1. The reference electric potential Vref may be applied to a non-inverting input of the charge amplifier CA. A capacitor Cfb may be connected to the inverting input of the charge amplifier CA and an output of the charge amplifier CA.

In FIG. 9A, when the input device PN approaches, an induced current i may flow through the first sensing electrode group 210G by the magnetic field B-field output from the input device PN. The induced current i may flow through the first adjacent sensing electrode 210-1 and the second adjacent sensing electrode 210-2 electrically connected to the first adjacent sensing electrode 210-1 by the first sensing line 230.

L2 denotes a parasitic inductance generated in a sensing electrode of the first sensing electrode group 210G. R denotes a resistance between a position at which the touch event occurs on the sensing electrode of first sensing electrode group 210G and a pad PD3 from which the induced current i is output among the pads PD. A level of resistance R may be changed depending on an input position of the input device PN. As an example, as the input position of the input device PN moves away from the driving circuit T-IC, the size of the resistance may increase. The level of the resistance R may decrease a sensitivity of the input. The capacitor Cfb may receive the induced current i and may output a voltage signal based on the induced current i.

According to an embodiment, when the input device PN approaches, the driving circuit T-IC may apply the second control signal to the switch SW. The switch SW may connect the second adjacent sensing electrode 210-2 to the reference electric potential Vref. That is, the first adjacent sensing electrode 210-1 may be connected to the driving circuit T-IC, and the second adjacent sensing electrode 210-2 may be connected to the reference electric potential Vref. The induced current i may flow along the closed-loop formed by the first sensing electrode group 210G. Accordingly, the resistance R of the input sensor IS may decrease, the resistance acting on the input device PN may be reduced, and the sensitivity of the input may be increased.

In FIG. 9B, when the user touch UTI approaches, the driving circuit T-IC may output a detection signal to the first sensing electrode group 210G and may receive the sensing signal from the second sensing electrode group 220G (refer to FIG. 8A) (e.g., a mutual capacitance defined between the points of the electrodes at which the user touch occurs). In this case, the input caused by the user touch UTI may be sensed based on a variation in capacitance.

According to an embodiment, when the user touch UTI approaches, the driving circuit T-IC may apply the first control signal to the switch SW. Responsive to the first control signal, the switch SW may connect the second adjacent sensing electrode 210-2 to the driving circuit T-IC. That is, the switch SW may connect the second line 242 of the second sensing line 240 to the first line 241 of the second sensing line 240.

Figure 10A:
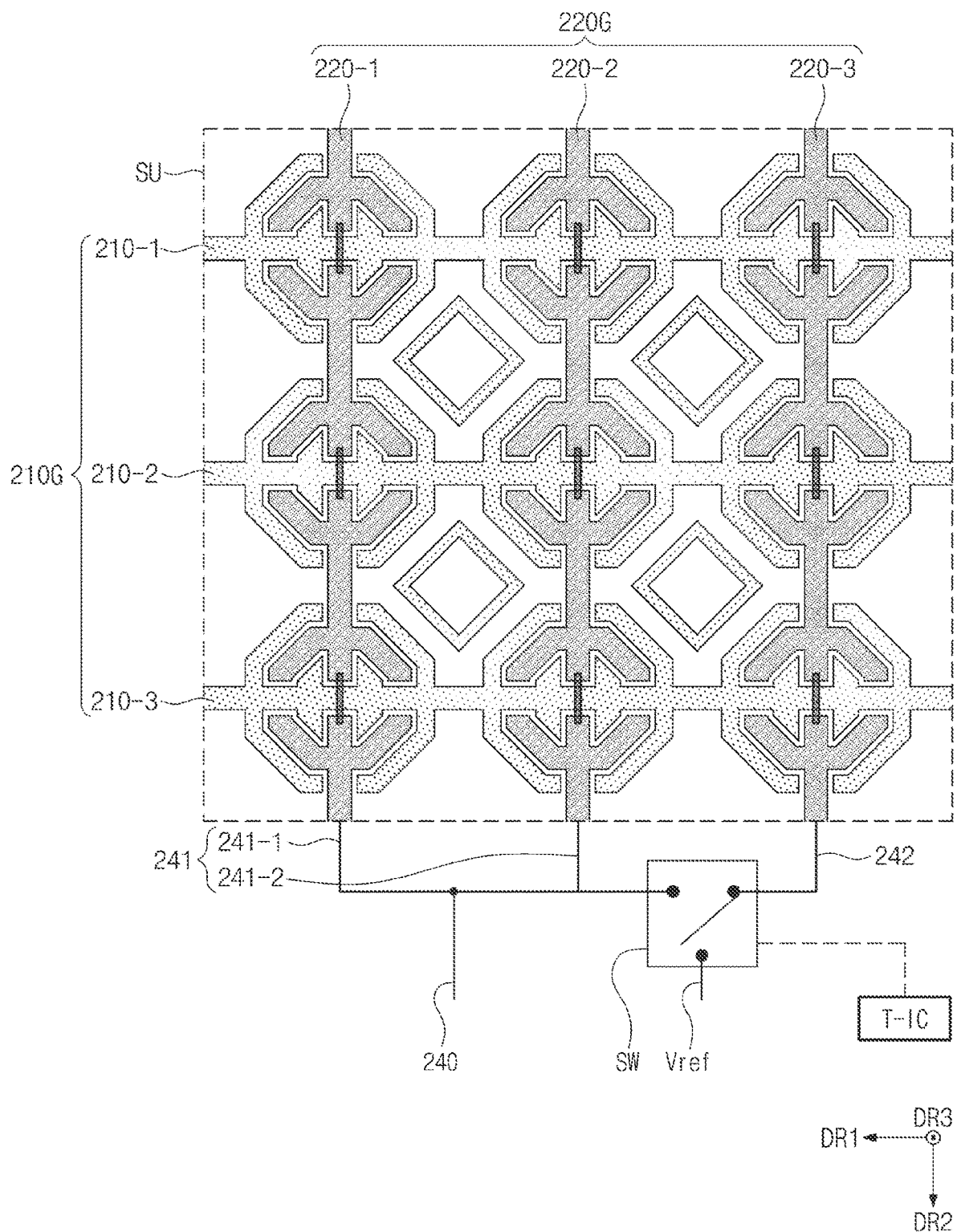
FIGS. 10A and 10B are views showing sensing lines according to embodiments of the present disclosure.
Figure 10B:
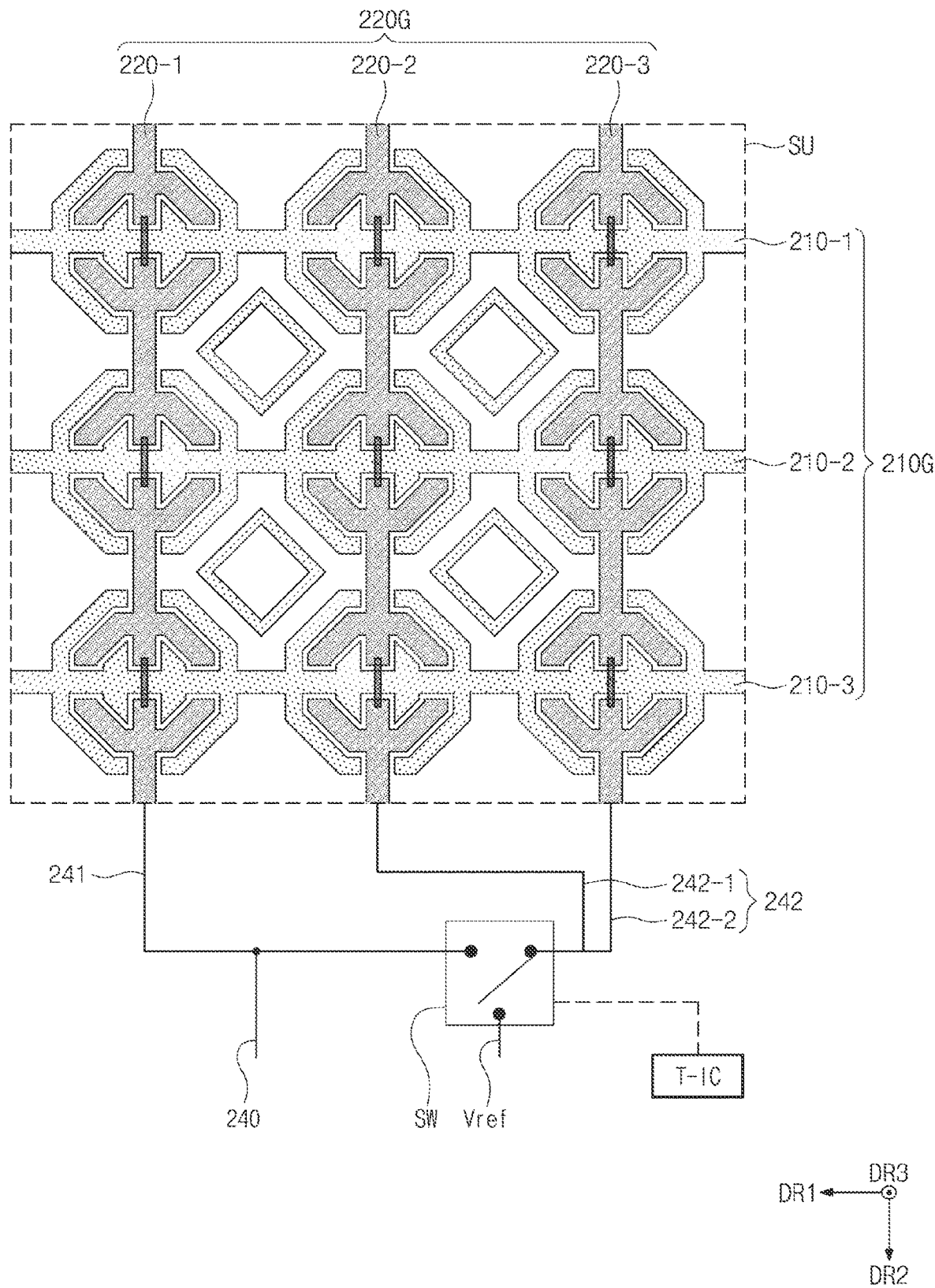
Figure 11A:
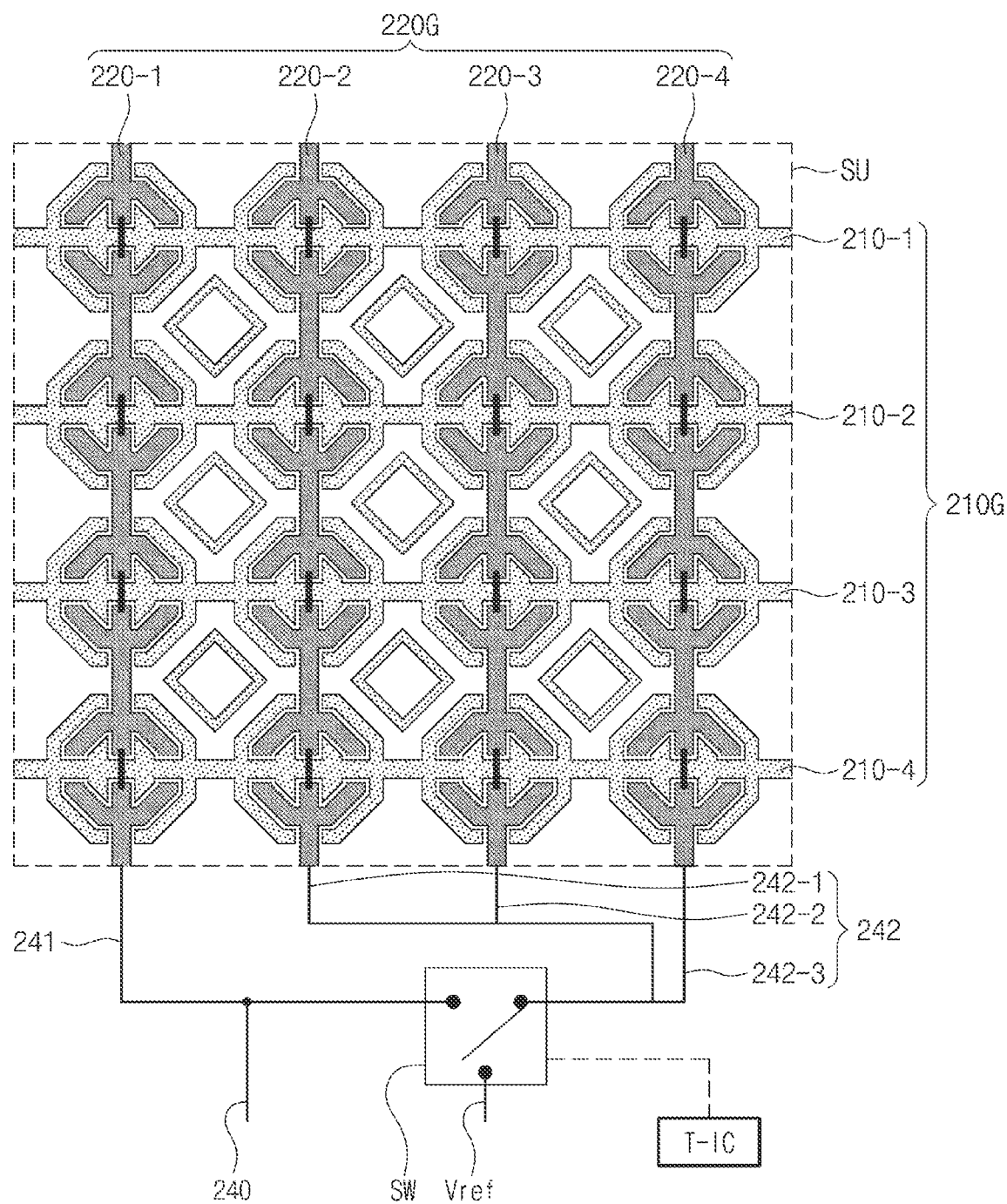
FIGS. 11A to 11C are views showing sensing electrodes and sensing lines according to embodiments of the present disclosure.
Figure 11B:
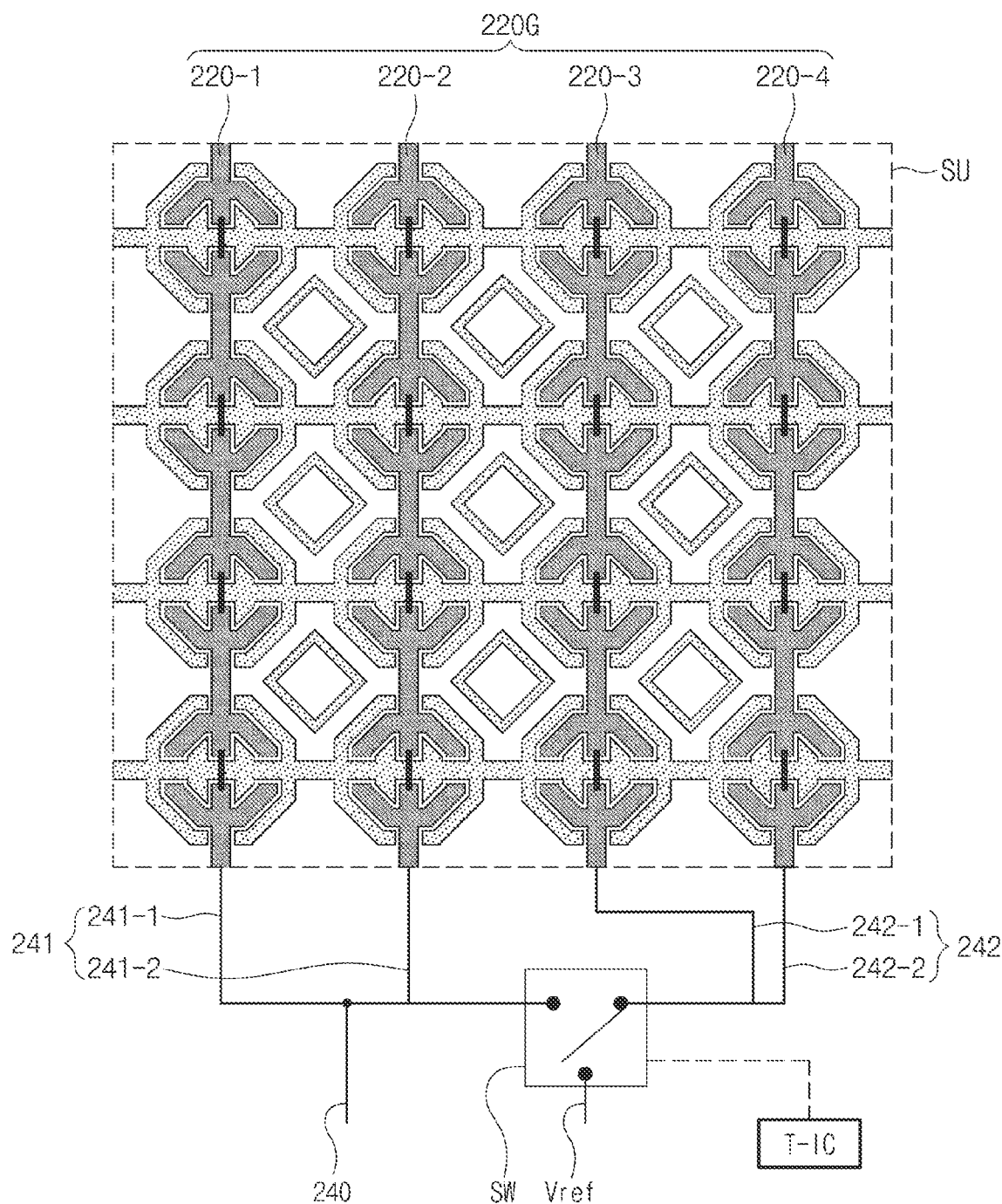
Figure 11C:
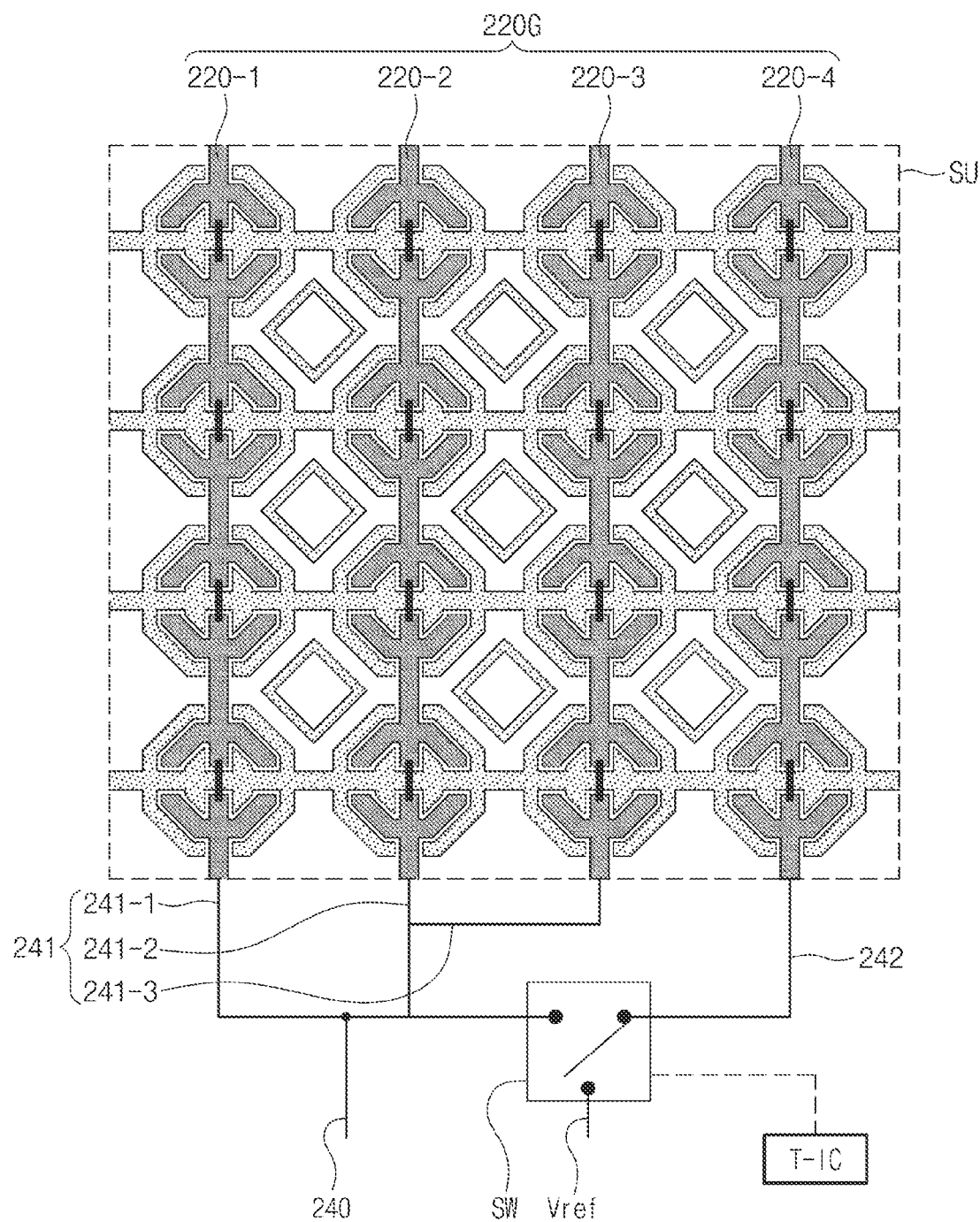

FIGS. 10A and 10B are views showing sensing lines according to embodiments of the present disclosure. FIGS. 11A to 11C are views showing sensing electrodes and sensing lines according to embodiments of the present disclosure. FIGS. 12A to 12D are views showing sensing electrodes and sensing lines according to embodiments of the present disclosure. FIG. 13 is a view showing sensing electrodes and sensing lines according to an embodiment of the present disclosure. In FIGS. 10A to 13, the sensing electrodes may have substantially the same shape as that of FIG. 5D. However, this is merely one example. According to an embodiment, the shape of the sensing electrodes may be designed in various ways, including the shapes of FIGS. 5A and 5B.

FIGS. 10A and 10B show one sensing unit SU in which a first sensing electrode group 210G including three first sensing electrodes 210-1, 210-2, and 210-3 and a second sensing electrode group 220G including three second sensing electrodes 220-1, 220-2, and 220-3 crossing the first sensing electrode group 210G are included. In an embodiment, the one sensing unit SU includes the three first sensing electrodes 210-1, 210-2, and 210-3 electrically connected to each other and the three second sensing electrodes 220-1, 220-2, and 220-3 electrically connected to each other and crossing the three first sensing electrodes 210-1, 210-2, and 210-3. The first sensing electrodes 210-1, 210-2, and 210-3 may be electrically connected to each other by a first sensing line 230 (refer to FIG. 8B), and the second sensing electrodes 220-1, 220-2, and 220-3 may be electrically connected to each other by the first sensing line 230 (refer to FIG. 8B). The first sensing electrodes 210-1, 210-2, and 210-3 and the second sensing electrodes 220-1, 220-2, and 220-3 may be connected to a driving circuit T-IC or a reference electric potential Vref by a second sensing line 240.

In FIG. 10A, the second sensing line 240 may include a plurality of first lines 241-1 and 241-2 and a second line 242. The first lines 241-1 and 241-2 may be connected to the driving circuit T-IC, and the second line 242 may be selectively connected to the driving circuit T-IC or the reference electric potential Vref.

A first adjacent sensing electrode 220-1 and a second adjacent sensing electrode 220-2 may be connected to the driving circuit T-IC via the first lines 241-1 and 241-2. A third adjacent sensing electrode 220-3 may be selectively connected to the driving circuit T-IC or the reference electric potential Vref via the second line 242.

The second line 242 may include a switch SW. The switch SW may perform a switching operation to connect the third adjacent sensing electrode 220-3 to the driving circuit T-IC when a first control signal indicating an approach of the user touch is provided from the driving circuit T-IC, and to connect the third adjacent sensing electrode 220-3 to the reference electric potential Vref when a second control signal indicating an approach of the input device is provided.

In FIG. 10B, the second sensing line 240 may include a first line 241 and a plurality of second lines 242-1 and 242-2. A first adjacent sensing electrode 220-1 may be connected to the driving circuit T-IC, and a second adjacent sensing electrode 220-2 and a third adjacent sensing electrode 220-3 may be selectively connected to the driving circuit T-IC or the reference electric potential Vref via the switch SW connected to the second lines 242-1 and 242-2 based on the first and second control signals.

FIGS. 11A to 11C show one sensing unit SU in which a first sensing electrode group 210G including four first sensing electrodes 210-1, 210-2, 210-3, and 210-4 and a second sensing electrode group 220G including four second sensing electrodes 220-1, 220-2, 220-3, and 220-4 crossing the first sensing electrode group 210G are included. In an embodiment, the one sensing unit SU may include the four first sensing electrodes 210-1, 210-2, 210-3, and 210-4 electrically connected to each other by a first sensing line 230 (refer to FIG. 8B) and the four second sensing electrodes 220-1, 220-2, 220-3, and 220-4 electrically connected to each other by the first sensing line 230 (refer to FIG. 8B) and crossing the four first sensing electrodes 210-1, 210-2, 210-3, and 210-4.

In FIG. 11A, a second sensing line 240 may include a first line 241 and a plurality of second lines 242-1, 242-2, and 242-3. A first adjacent sensing electrode 220-1 may be connected to the driving circuit T-IC, and a second adjacent sensing electrode 220-2, a third adjacent sensing electrode 220-3, and a fourth adjacent sensing electrode 220-4 may be selectively connected to a driving circuit T-IC or a reference electric potential Vref via a switch SW connected to the second lines 242-1, 242-2, and 242-3 based on the first and second control signals.

In FIG. 11B, a second sensing line 240 may include a plurality of first lines 241-1 and 241-2 and a plurality of second lines 242-1 and 242-2. A first adjacent sensing electrode 220-1 and a second adjacent sensing electrode 220-2 may be connected to a driving circuit T-IC, and a third adjacent sensing electrode 220-3 and a fourth adjacent sensing electrode 220-4 may be selectively connected to the driving circuit T-IC or a reference electric potential Vref via a switch SW connected to the second lines 242-1 and 242-2 based on the first and second control signals.

In FIG. 11C, a second sensing line 240 may include a plurality of first lines 241-1, 241-2, and 241-3 and a second line 242. A first adjacent sensing electrode 220-1, a second adjacent sensing electrode 220-2, and a third adjacent sensing electrode 220-3 may be connected to a driving circuit T-IC, and a fourth adjacent sensing electrode 220-4 may be selectively connected to the driving circuit T-IC or a reference electric potential Vref via a switch SW connected to the second line 242 based on the first and second control signals.

FIGS. 12A to 12D show one sensing unit SU in which a first sensing electrode group 210G including five first sensing electrodes 210-1, 210-2, 210-3, 210-4, and 210-5 and a second sensing electrode group 220G including five second sensing electrodes 220-1, 220-2, 220-3, 220-4, and 220-5 and crossing the first sensing electrode group 210G are included. In an embodiment, the one sensing unit SU includes the five first sensing electrodes 210-1, 210-2, 210-3, 210-4, and 210-5 electrically connected to each other by a first sensing line 230 (refer to FIG. 8B) and the five second sensing electrodes 220-1, 220-2, 220-3, 220-4, and 220-5 electrically connected to each other by the first sensing line 230 (refer to FIG. 8B) and crossing the five first sensing electrodes 210-1, 210-2, 210-3, 210-4, and 210-5.

Figure 12A:
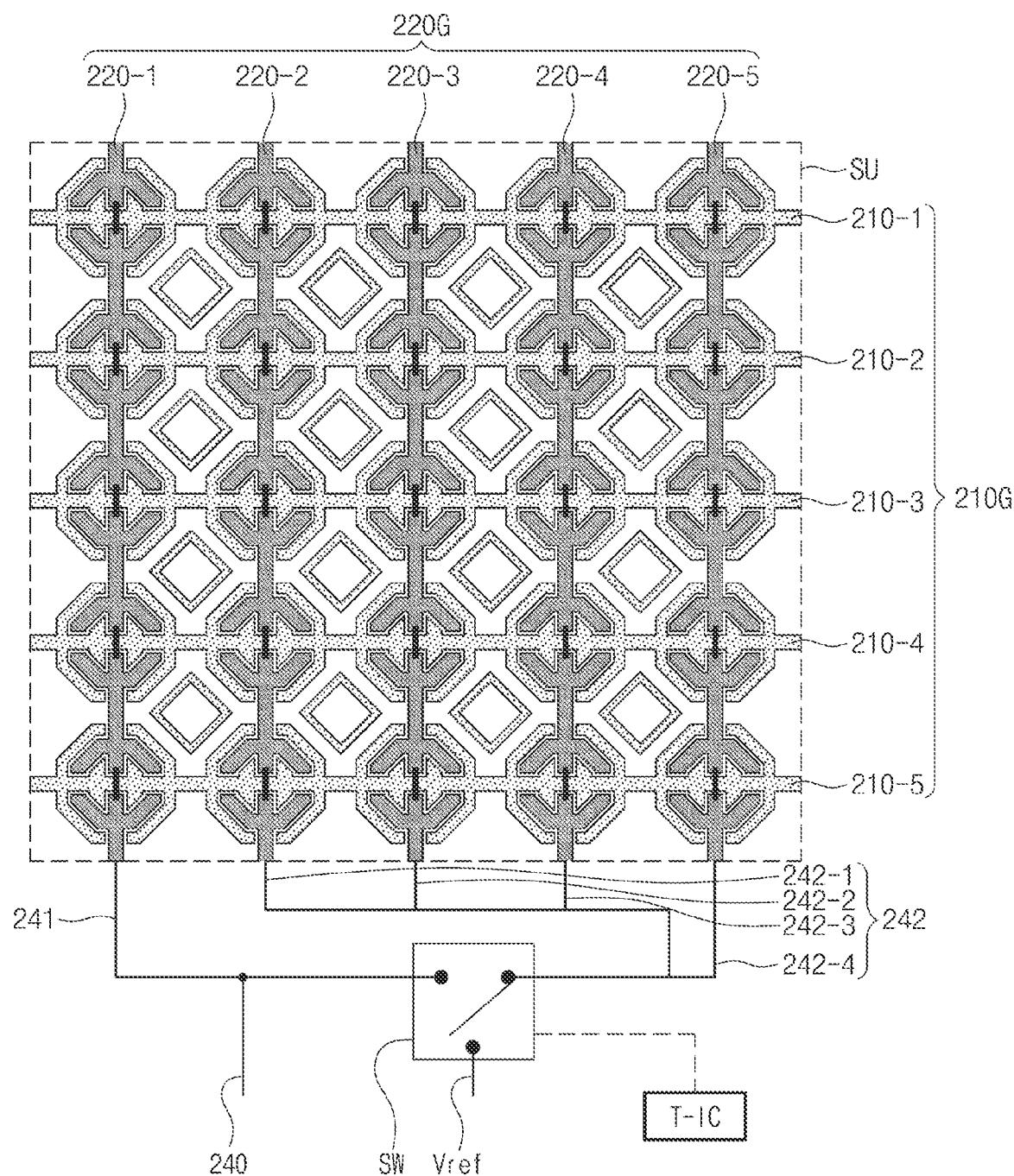
FIGS. 12A to 12D are views showing sensing electrodes and sensing lines according to embodiments of the present disclosure.
Figure 13:
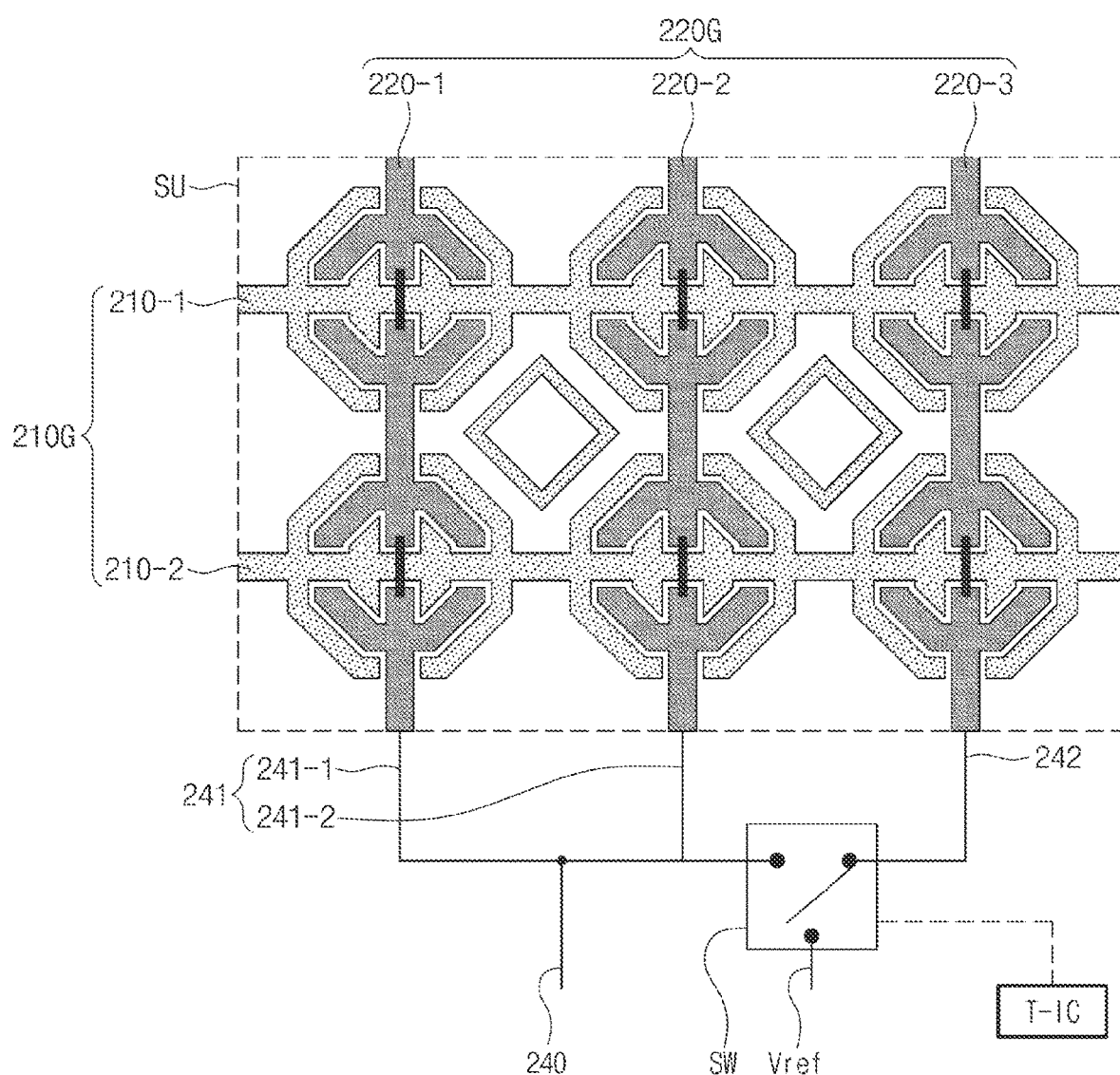
FIG. 13 is a view showing sensing electrodes and sensing lines according to an embodiment of the present disclosure.

Referring to FIG. 12A, a second sensing line 240 may include a first line 241 and a plurality of second lines 242-1, 242-2, 242-3, and 242-4. A first adjacent sensing electrode 220-1 may be connected to a driving circuit T-IC via the first line 241, and a second adjacent sensing electrode 220-2, a third adjacent sensing electrode 220-3, a fourth adjacent sensing electrode 220-4, and a fifth adjacent sensing electrode 220-5 may be selectively connected to the driving circuit T-IC or a reference electric potential Vref via a switch SW connected to the second lines 242-1, 242-2, 242-3, and 242-4 based on the first and second control signals.

Figure 12B:
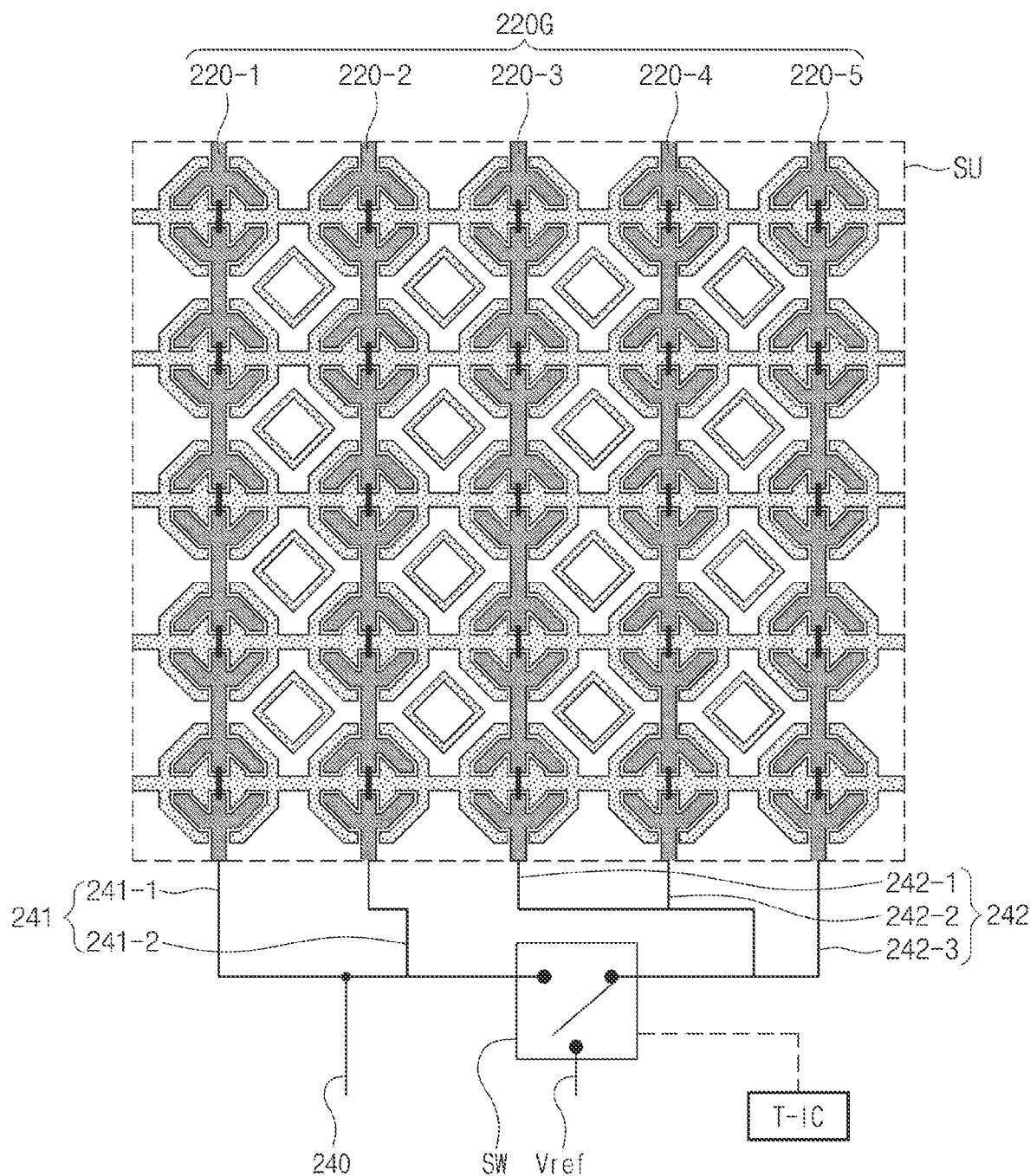

Referring to FIG. 12B, a second sensing line 240 may include a plurality of first lines 241-1 and 241-2 and a plurality of second lines 242-1, 242-2, and 242-3. A first adjacent sensing electrode 220-1 and a second adjacent sensing electrode 220-2 may be connected to a driving circuit T-IC via the first lines 241-1 and 241-2, and a third adjacent sensing electrode 220-3, a fourth adjacent sensing electrode 220-4, and a fifth adjacent sensing electrode 220-5 may be selectively connected to the driving circuit T-IC or a reference electric potential Vref via a switch SW connected to the second lines 242-1, 242-2, and 242-3 based on first and second control signals.

Figure 12C:
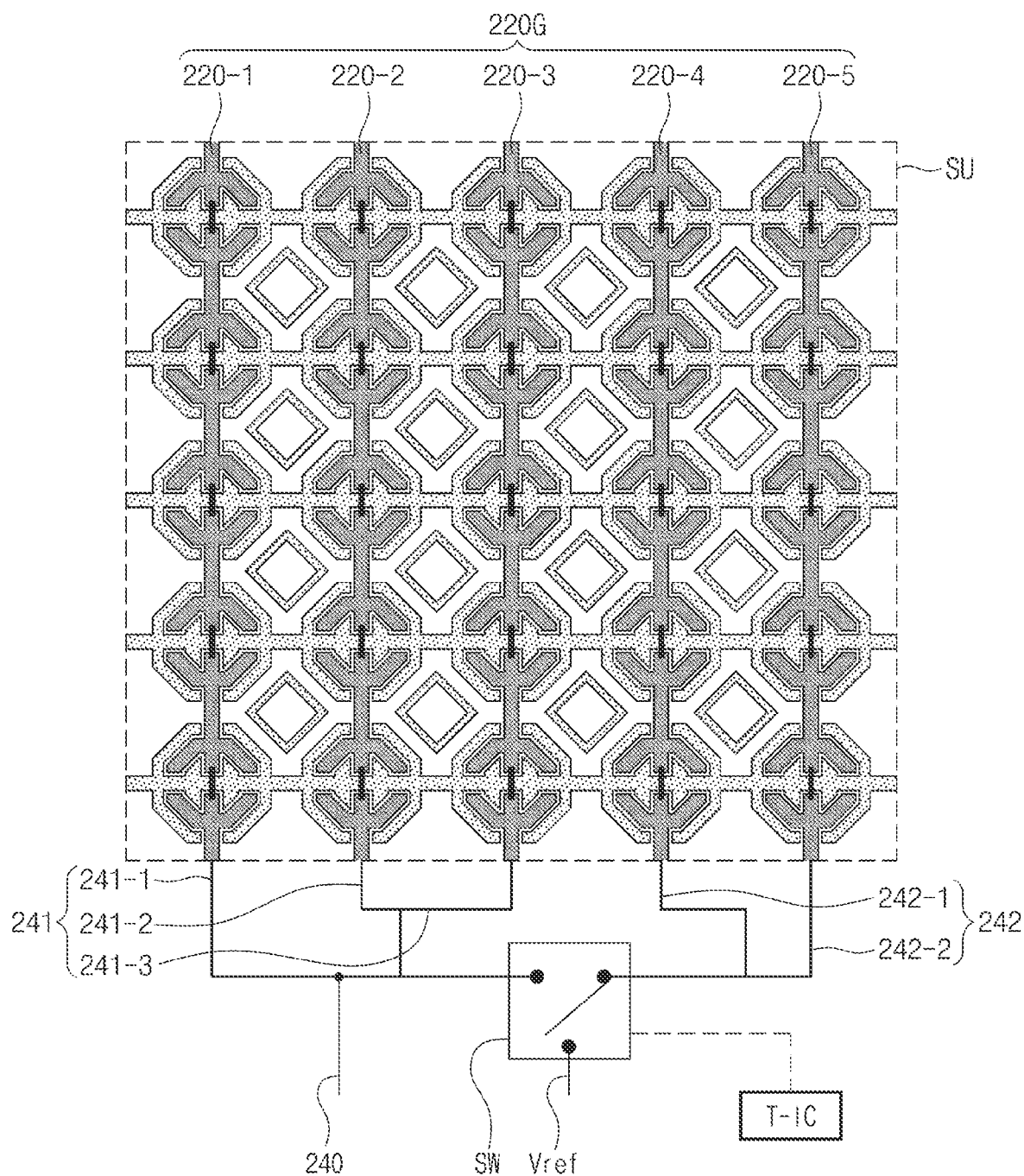

Referring to FIG. 12C, a second sensing line 240 may include a plurality of first lines 241-1, 241-2, and 241-3 and a plurality of second lines 242-1 and 242-2. A first adjacent sensing electrode 220-1, a second adjacent sensing electrode 220-2, and a third adjacent sensing electrode 220-3 may be connected to a driving circuit T-IC via the first lines 241-1, 241-2, and 241-3, and a fourth adjacent sensing electrode 220-4 and a fifth adjacent sensing electrode 220-5 may be selectively connected to the driving circuit T-IC or a reference electric potential Vref via a switch SW connected to the second lines 242-1 and 242-2 based on the first and second control signals.

Figure 12D:
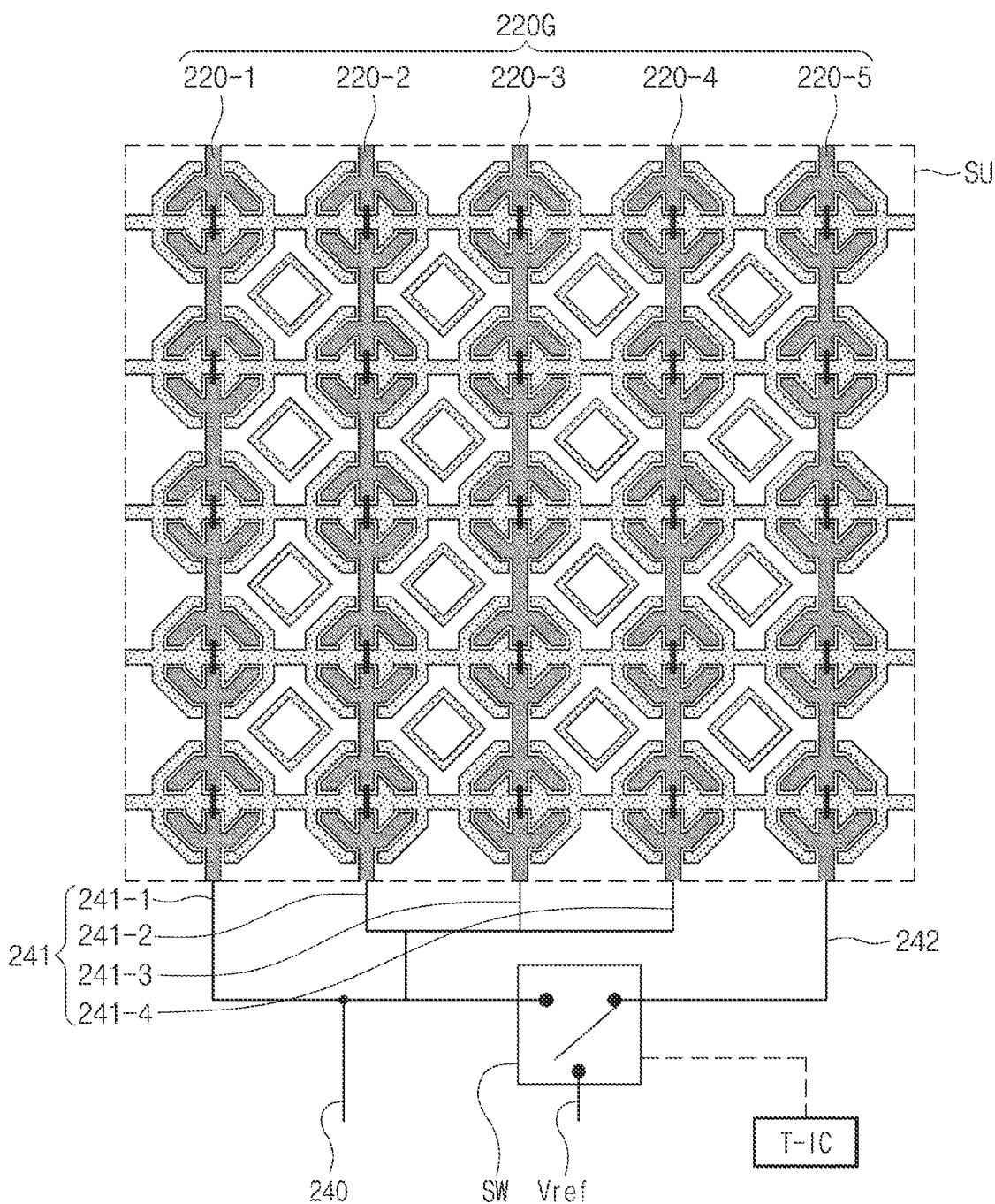

Referring to FIG. 12D, a second sensing line 240 may include a plurality of first lines 241-1, 241-2, 241-3, and 241-4 and a second line 242. A first adjacent sensing electrode 220-1, a second adjacent sensing electrode 220-2, a third adjacent sensing electrode 220-3, and a fourth adjacent sensing electrode 220-4 may be connected to a driving circuit T-IC via the first lines 241-1, 241-2, 241-3, and 241-4, and a fifth adjacent sensing electrode 220-5 may be selectively connected to the driving circuit T-IC or a reference electric potential Vref via a switch SW connected to the second line 242 based on the first and second control signals.

In FIGS. 12A to 12D, the first to fifth adjacent sensing electrodes 220-1, 220-2, 220-3, 220-4, and 220-5 of the second sensing electrode group 220G are described as a representative example, and the above descriptions on the second sensing electrode group 220G may also be applied to the first sensing electrode group 210G.

FIG. 13 shows one sensing unit SU in which a first sensing electrode group 210G including two first sensing electrodes 210-1 and 210-2 and a second sensing electrode group 220G including three second sensing electrodes 220-1, 220-2, and 220-3 and crossing the first sensing electrode group 210G are included.

In an embodiment, the one sensing unit SU may include the two first sensing electrodes 210-1 and 210-2 electrically connected to each other by a first sensing line 230 (refer to FIG. 8B), and the three second sensing electrodes 220-1, 220-2, and 220-3 electrically connected to each other by the first sensing line 230 (refer to FIG. 8B) and crossing the two first sensing electrodes 210-1 and 210-2.

Referring to FIG. 13, a second sensing line 240 connected to the second sensing electrode group 220G may include a plurality of first lines 241-1 and 241-2 and a second line 242. A first adjacent sensing electrode 220-1 and a second adjacent sensing electrode 220-2 may be connected to a driving circuit T-IC via the first lines 241-1 and 241-2, and a third adjacent sensing electrode 220-3 may be selectively connected to a driving circuit T-IC or a reference electric potential Vref via a switch SW connected to the second line 242 based on the first and second control signals.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An electronic device, comprising:
    a display panel;
    an input sensor disposed on the display panel, comprising a plurality of sensing electrodes and a plurality of sensing lines connected to the sensing electrodes, and selectively operating in a pen sensing mode or a touch mode; and
    a driving circuit that drives the input sensor, generates a control signal based on a type of input applied to the input sensor, and comprises a charge amplifier,
    wherein the sensing lines comprise:
        a first sensing line directly electrically connecting first ends of sensing electrodes directly adjacent to each other among the sensing electrodes; and
        a second sensing line connecting at least one of second ends, which are opposite to the first ends, of the directly adjacent sensing electrodes to the driving circuit, and selectively connecting other sensing electrodes to the at least one of second ends or a reference electric potential in response to the control signal,
    wherein a first input of the charge amplifier is electrically connected to the directly adjacent sensing electrodes in the touch mode, and
    wherein the first input of the charge amplifier is electrically connected to at least one of the directly adjacent sensing electrodes and a second input of the charge amplifier is electrically connected to the other sensing electrodes in the pen sensing mode.

2. The electronic device of claim 1, wherein the driving circuit generates a first control signal when the input applied to the input sensor is generated by a user touch and generates a second control signal when the input applied to the input sensor is generated by an input device.

3. The electronic device of claim 2, wherein the second sensing line connects the other sensing electrodes to the driving circuit when the first control signal is generated, and connects the other sensing electrodes to the reference electric potential when the second control signal is generated.

4. The electronic device of claim 1, wherein the input sensor is disposed directly on the display panel.

5. The electronic device of claim 1, wherein the input sensor comprises a plurality of sensing electrode groups each comprising the sensing electrodes adjacent to each other, and each of the sensing electrode groups forms a closed-loop defined by the sensing electrodes adjacent to each other, the first sensing line, and the second sensing line.

6. The electronic device of claim 5, wherein the input sensor comprises a plurality of sensing units, and each of the sensing electrode groups is disposed in each of the sensing units.

7. The electronic device of claim 6, wherein the sensing electrode groups comprise:
    first sensing electrode groups extending in a first direction and arranged in a second direction crossing the first direction; and
    second sensing electrode groups arranged in the first direction and extending in the second direction.

8. The electronic device of claim 7, wherein the sensing units are defined as areas where the first sensing electrode groups cross the second sensing electrode groups.

9. The electronic device of claim 7, wherein each of the first sensing electrode groups comprises n sensing electrodes adjacent to each other, and each of the second sensing electrode groups comprises m sensing electrodes adjacent to each other, wherein n and m are natural numbers.

10. The electronic device of claim 9, wherein n and m are a same natural number.

11. The electronic device of claim 1, wherein the second sensing line comprises a switch, and the switch receives the control signal and is selectively connected to the driving circuit or the reference electric potential based on the control signal.

12. The electronic device of claim 11, further comprising:
    a flexible circuit board provided with the driving circuit disposed thereon and connected to the input sensor, wherein the switch is disposed on the flexible circuit board.

13. The electronic device of claim 1, wherein the display panel comprises:
    a display area and a non-display area adjacent to the display area,
    wherein the input sensor comprises a sensing area corresponding to the display area and a peripheral area corresponding to the non-display area, the sensing electrodes are disposed in the sensing area, and the sensing lines are disposed in the peripheral area.

14. An electronic device, comprising:
    a display panel;
    an input sensor disposed on the display panel, comprising a plurality of sensing electrodes and a plurality of sensing lines connected to the sensing electrodes, and selectively operating in a pen sensing mode or a touch mode; and a driving circuit that drives the input sensor, generates a first control signal or a second control signal based on a type of input applied to the input sensor, and comprises a charge amplifier, wherein the sensing lines comprise:
- a first sensing line directly electrically connecting a first end of a first sensing electrode and a first end of a second sensing electrode directly adjacent to the first sensing electrode among the sensing electrodes; and
- a second sensing line comprising a switch connecting a second end of the first sensing electrode to the driving circuit, connecting the second sensing electrode to the first sensing electrode when the first control signal is provided, and connecting the second sensing electrode to a reference electric potential when the second control signal is provided, wherein a first input of the charge amplifier is electrically connected to the first sensing electrode and the second sensing electrode in the touch mode, and wherein the first input of the charge amplifier is electrically connected to the first sensing electrode and a second input of the charge amplifier is electrically connected to the second sensing electrode in the pen sensing mode.

15. The electronic device of claim 14, wherein the driving circuit generates the first control signal when the input applied to the input sensor is generated by a user touch and generates the second control signal when the input applied to the input sensor is generated by an input device.

16. The electronic device of claim 14, wherein the input sensor comprises a plurality of sensing electrode groups respectively comprising the first sensing electrode and the second sensing electrode, and the sensing electrode groups comprise:
- first sensing electrode groups extending in a first direction and arranged in a second direction crossing the first direction; and
- second sensing electrode groups arranged in the first direction and extending in the second direction.

17. The electronic device of claim 16, wherein the input sensor comprises a plurality of sensing units defined as areas where the first sensing electrode groups cross the second sensing electrode groups.

18. The electronic device of claim 16, wherein each of the sensing electrode groups forms a closed-loop defined by the first sensing line and the second sensing line.

19. The electronic device of claim 14, wherein the input sensor comprises a sensing area in which the sensing electrodes are disposed and a peripheral area adjacent to the sensing area, and the switch is disposed in the peripheral area of the input sensor or on a circuit board on which the driving circuit is disposed.

20. An electronic device, comprising:
- a display panel;
- an input sensor disposed on the display panel, and selectively operating in a pen sensing mode or a touch mode; and
- a driving circuit that drives the input sensor, and comprises a charge amplifier, wherein the input sensor comprises:
- a first sensing electrode;
- a second sensing electrode directly adjacent to the first sensing electrode;
- a first line directly electrically connecting the first sensing electrode to the second sensing electrode; and
- a second line selectively connecting the second sensing electrode to the first sensing electrode or a reference electric potential, wherein a first input of the charge amplifier is electrically connected to the first sensing electrode and the second sensing electrode in the touch mode, and wherein the first input of the charge amplifier is electrically connected to the first sensing electrode and a second input of the charge amplifier is electrically connected to the second sensing electrode in the pen sensing mode.

* * * * *